United States Patent
Suresh et al.

(10) Patent No.: US 10,496,373 B2
(45) Date of Patent: Dec. 3, 2019

(54) UNIFIED INTEGER AND CARRY-LESS MODULAR MULTIPLIER AND A REDUCTION CIRCUIT

(71) Applicant: Intel Corporation, Santa Clara, CA (US)

(72) Inventors: Vikram B. Suresh, Hillsboro, OR (US); Sanu K. Mathew, Hillsboro, OR (US); Sudhir K. Satpathy, Hillsboro, OR (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/857,281

(22) Filed: Dec. 28, 2017

(65) Prior Publication Data

US 2019/0205093 A1 Jul. 4, 2019

(51) Int. Cl.
*G06F 7/523* (2006.01)
*G06F 7/72* (2006.01)

(52) U.S. Cl.
CPC .............. *G06F 7/523* (2013.01); *G06F 7/722* (2013.01); *G06F 7/724* (2013.01)

(58) Field of Classification Search
USPC ........................................ 708/492, 510, 620
See application file for complete search history.

(56) References Cited

U.S. PATENT DOCUMENTS

| 7,464,128 B1* | 12/2008 | Pitsianis | G06F 7/724 708/492 |
| 8,244,790 B2* | 8/2012 | Satoh | G06F 7/724 708/492 |
| 2004/0019622 A1* | 1/2004 | Elbe | G06F 7/722 708/492 |
| 2009/0006517 A1* | 1/2009 | Gopal | G06F 7/72 708/492 |
| 2018/0062843 A1* | 3/2018 | Gopal | G06F 7/725 |

FOREIGN PATENT DOCUMENTS

DE 3631992 C2 * 12/1988 ............ G06F 7/721

OTHER PUBLICATIONS

"Announcing the Advanced Encryption Standard (AES)", Federal Information Processing Standards Publication 197, Nov. 26, 2001, 51 pages.
McGrew, D., et al., "The Use of Galois Message Authentication Code (GMAC) in IPsec ESP and AH", Network Working Group Request for Comments: 4543, May 2006, accessed at: https://tools.ietf.org/pdf/rfc4543.pdf, 14 pages.
Nir, Y., et al., "ChaCha20 and Poly1305 for ITEF Protocols", Internet Research Task Force (IRTF) Request for Comments: 7539, May 2015, accessed at: https://tools.ietf.org/pdf/rfc7539.pdf, 45 pages.

(Continued)

*Primary Examiner* — Andrew Caldwell
*Assistant Examiner* — Emily E Larocque
(74) *Attorney, Agent, or Firm* — Alliance IP, LLC

(57) ABSTRACT

In one embodiment, a processor comprises a multiplier circuit to operate in an integer multiplication mode responsive to a first value of a configuration parameter; and operate in a carry-less multiplication mode responsive to a second value of the configuration parameter.

18 Claims, 16 Drawing Sheets

(56) References Cited

OTHER PUBLICATIONS

Salowey, J., et al., "AES Galois Counter Mode (GCM) Cipher Suites for TLS", Network Working Group Request for Comments: 5288, Aug. 2008, accessed at: https://tools.ietf.org/pdf/rfc5288.pdf, 8 pages.
Viega, J., et al., "The Use of Galois/Counter Mode (GCM) in IPsec Encapsulating Security Payload (ESP)", Network Working Group Request for Comments: 4106, Jun. 2005, accessed at: https://tools.ietf.org/pdf/rfc4106.pdf, 11 pages.

* cited by examiner

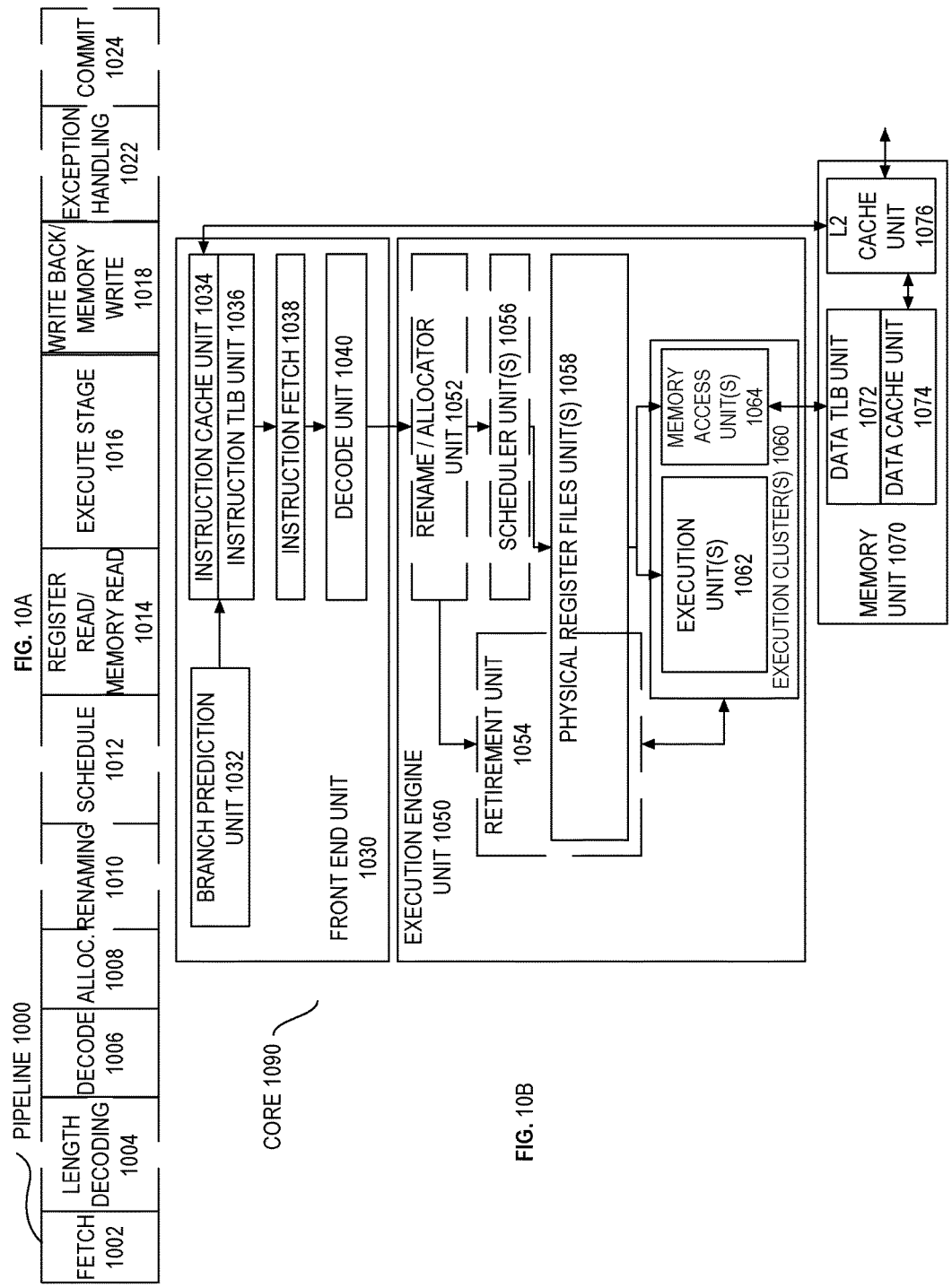

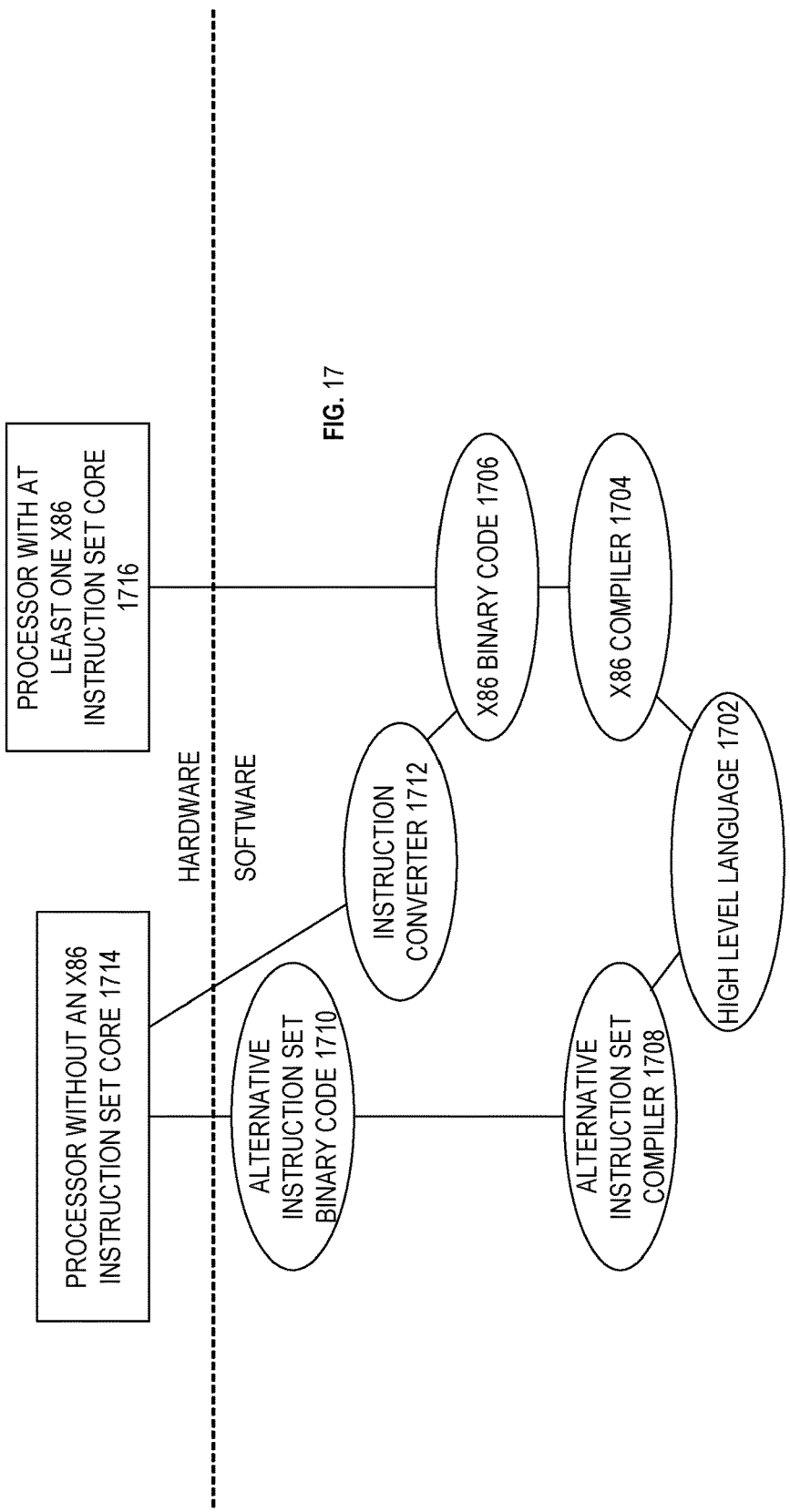

UNIFIED INTEGER AND CARRY-LESS MODULAR MULTIPLIER AND A REDUCTION CIRCUIT

FIELD

The present disclosure relates in general to the field of computer development, and more specifically, to a unified integer and carry-less modular multiplier and a reduction circuit.

BACKGROUND

Advanced Encryption Standard (AES) implemented in the Galois Counter Mode (GCM) has been the de facto encryption cipher used for Authenticated Encryption with Additional Data (AEAD) in the Transport Layer Security (TLS) protocol. However, in TLS Protocol version 1.3, the Internet Engineering Task Force (IETF) has standardized the ChaCha20/Poly1305 AEAD algorithm as an alternative to AES-GCM for authenticated encryption. This new algorithm is already supported by various internet browsers.

BRIEF DESCRIPTION OF THE DRAWINGS

FIG. 10A is a block diagram illustrating both an exemplary in-order pipeline and an exemplary register renaming, out-of-order issue/execution pipeline in accordance with certain embodiments;

FIG. 10B is a block diagram illustrating both an exemplary embodiment of an in-order architecture core and an exemplary register renaming, out-of-order issue/execution architecture core to be included in a processor in accordance with certain embodiments;

FIG. 17 is a block diagram contrasting the use of a software instruction converter to convert binary instructions in a source instruction set to binary instructions in a target instruction set in accordance with certain embodiments.

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
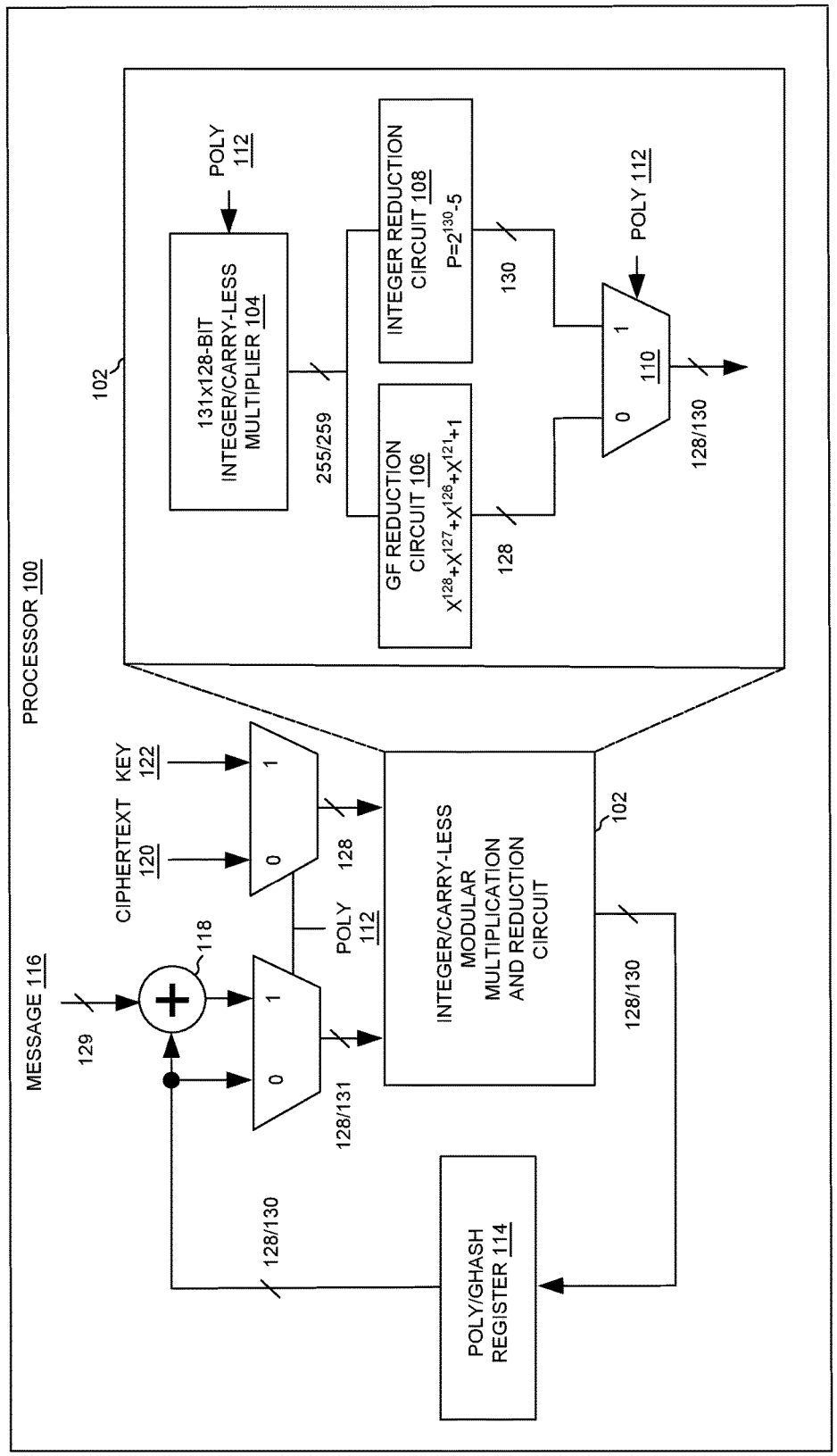
FIG. 1 illustrates a block diagram of a processor comprising a unified integer and carry-less modular multiplier and reduction circuits in accordance with certain embodiments.

FIG. 1 illustrates a block diagram of a processor 100 comprising a unified integer and carry-less modular multiplier 104 and reduction circuits 106 and 108 in accordance with certain embodiments. The multiplier 104 and reduction circuits 106 and 108 are part of integer/carry-less modular multiplication and reduction circuit 102. Circuit 102 may be used to implement portions of multiple different authenticated encryption algorithms. For example, circuit 102 may perform a GHASH function in the case of AES-GCM and a Poly1305 function in the case of ChaCha20/Poly1305 to generate the authentication signature in the respective authenticated encryption algorithm. In various embodiments, circuit 102 may be used to implement portions of any suitable authenticated encryption algorithms.

In a particular embodiment, when an AES-GCM algorithm is performed at least in part by processor 100, circuit 102 may perform a GHASH function. The GHASH function may perform a 128-bit×128-bit carry-less multiplication in the Galois Field to generate a 255-bit product which is then reduced using a field polynomial ($x^{128}+x^7+x^2+x+1$ in GCM mode) to obtain a 128-bit result. For example, the GHASH function may multiply a subkey 'H' (128'h0 encrypted with an encryption key) with a block of Additional Authentication Data (AAD) or encrypted data (e.g., ciphertext 120) to generate a GHASH result that is stored in POLY/GHASH REGISTER 114. In the next iteration, the current GHASH result may be multiplied against another block of AAD and/or encrypted data (e.g., ciphertext 120) to generate a new GHASH result. At each iteration, the cumulative GHASH result is multiplied with AAD or encrypted data to generate a new GHASH result. The final GHASH result forms the basis for an authentication signature for the AAD and encrypted data.

As another example, when a ChaCha20/Poly1305 algorithm is performed at least in part by processor 100, circuit 102 may perform a Poly1305 function. In the Poly1305 function, an input message is combined with an intermediate signature using a modular multiplication operation. The computation intensive operation in the Poly1305 function is the integer modular multiplication of ((Acc+block)*r)% P; where 'Acc' is a 130-bit intermediate result (i.e., the result from register 114), 'block' is the 129-bit padded message block (i.e., message 116), 'r' is a 128-bit key (i.e., key 122) and 'P' is $2^{130}-5$, the prime number used for the modulo operation.

Various methods for implementing new AEAD algorithms such as ChaCha-20/Poly-1305 may include implementing the algorithms entirely in software or designing a dedicated hardware accelerator for the performance critical operations such as the modular multiplication. However, software/micro-code implementations of Poly-1305, which requires a 131×128-bit multiplication followed by reduction, often cannot meet the desired performance requirements. A dedicated hardware accelerator for each non-AES-GCM AEAD algorithm increases the product cost (e.g., silicon area and leakage power increase) and requires significant design and validation efforts.

The Poly1305 modular multiplication shares characteristics with the multiplication operation performed in the GHASH function. Accordingly, in various embodiments of the present disclosure, multiplication operations of two different authenticated encryptions algorithms (e.g., AES-GCM and ChaCha20/Poly1305) may be accelerated using a unified multiplier 104 that may be configured to operate in an integer mode (e.g., for the Poly1305 function) or carry-less mode (e.g., for the GHASH function). In a particular embodiment, in addition to at least one (or both) of the integer mode or the carry-less mode, the unified multiplier 104 may also operate in a packed carry-less mode in which multiple discrete carry-less multiplications are performed in parallel by the multiplier 104. For example, a first 128-bit input to the multiplier may include smaller discrete operands (e.g., 16 8-bit operands) and a second 128-bit input (or 131-bit input) may include smaller discrete operands (16 8-bit operands). Each 8-bit operand of the first 128-bit input may be multiplied with a corresponding 8-bit operand of the second 128-bit input in the packed carry-less mode.

Various embodiments may significantly improve performance relative to a pure software implementation by accelerating the modular multiplication operation of, e.g., Poly-1305 while avoiding the overhead of a separate multiplier by reconfiguring and reusing the multiplier used during the GHASH function. In a particular embodiment, a unified integer/carry-less multiplier 104 can be used to accelerate both of the recommended AEAD algorithms (AES-GCM and ChaCha20/Poly1305) in TLS 1.3.

In various embodiments of the present disclosure, during performance of the Poly1305 algorithm, the output of the multiplier is reduced using an optimized Barrett reduction. In a particular embodiment, two 131-bit additions are performed instead of the conventional two multiplications and a subtraction to perform the reduction using the Poly1305 prime of $2^{130}-5$. The optimized Barrett reduction based residue calculation for Poly1305 provides significant area and performance advantage over using a generic reduction block.

FIG. 1 depicts a processor 100 to perform the GHASH function and the Poly1305 function. The particular function performed by the processor 100 is determined by the value of the Poly signal 112. Poly signal 112 is one example, of a configuration parameter that may be used to configure the multiplier 104 (and other circuitry). In the embodiment depicted, Poly signal 112 is a binary signal. In other embodiments, e.g., where the multiplier may be configured in three or more modes (e.g., when the multiplier may also be configured in a packed carry-less mode), the configuration parameter may specify three or more different values. In the embodiment depicted, when the Poly signal 112 is enabled, the processor 100 is configured to perform the Poly1305 function and when the Poly signal 112 is not enabled, the processor 100 is configured to perform the GHASH function.

When the Poly signal 112 is enabled, a 130-bit intermediate result stored in Poly/GHASH register 114 is added to a 129-bit message 116 (i.e., the data to be authenticated) to generate a 131-bit result. The result is passed to the multiplication and reduction circuit 102. When the Poly signal 112 is enabled, a 128-bit key 122 (which may be held constant over multiple iterations) is also passed to the multiplication and reduction circuit 102. The 131-bit result is multiplied with the 128-bit key by multiplier 104, which is configured to perform an integer multiplication when the Poly signal 112 is enabled. This integer multiplication results in a product of 259 bits which is then reduced by integer reduction circuit 108 to a 130-bit value. In one embodiment, the integer reduction circuit 108 includes circuitry that is dedicated to performing the reduction operation. In another embodiment, the integer reduction circuit 108 includes circuitry that is shared to perform additional operations of the processor 100. For example, the integer reduction circuit 108 may be included in a processor core and the operations of the integer reduction circuit 108 may be implemented through software instructions executed by the processor core. The result of the reduction circuit 108 is passed through multiplexer 110 and stored in register 114 as an intermediate result. During a following iteration, the message 116 may be updated and the calculations may be repeated to generate a new result stored in register 114. This cycle may be repeated any number of times.

When the Poly signal 112 is not enabled, a 128-bit intermediate result is provided from the register 114 to the multiplication and reduction circuit 102. A 128-bit ciphertext 120 (e.g., encrypted data) is also provided as input to the multiplication and reduction circuit 102. Alternatively, during one or more iterations, 128 bits of data that is to be authenticated (but not encrypted) may be provided to circuit 102 in place of ciphertext 120. A 128-bit by 128-bit carry-less multiplication is then performed by multiplier 104 on the inputs. The 255-bit output is provided to the Galois Field reduction circuit 106, which reduces the 255-bit value to 128-bit value in accordance with the field polynomial $x^{128}+x^{127}+x^{126}+x^{121}+1$. In one embodiment, the reduction circuit 106 may include circuitry to perform multiple stages of XOR operations (effectively subtracting the polynomial multiple times to perform a modulo operation) until the result is 128 bits long, though other embodiments contemplate any suitable circuitry to reduce the 255-bit value using the field polynomial. The GF reduction circuit 106 may include hardware that is dedicated to performing the reduction operations or may include hardware that is shared to perform additional operations (e.g., the GF reduction circuit 106 may comprise processor circuitry that performs the reduction operations by executing software instructions, which in one embodiment may be the same processor circuitry used to perform the integer reduction operations in software). The 128-bit result of the reduction circuit 106 is passed through multiplexer 110 and the result is stored in register 114. The ciphertext 120 (or other input data) may be updated and the calculations are repeated to generate a new result stored in register 114. This cycle may be repeated any number of times.

Although in the depicted embodiment the processor is adapted for performing the AES-GCM and ChaCha20/Poly1305 authenticated encryption algorithms, in other embodiments, the multiplier 104 may be used to perform operations for any suitable authenticated encryption algorithms or may perform any suitable authentication or encryption operations. Although particular bit-lengths are depicted for inputs, outputs, and operations, other bit-lengths may be used within processor 100 according to the particular implementation.

Figure 2:
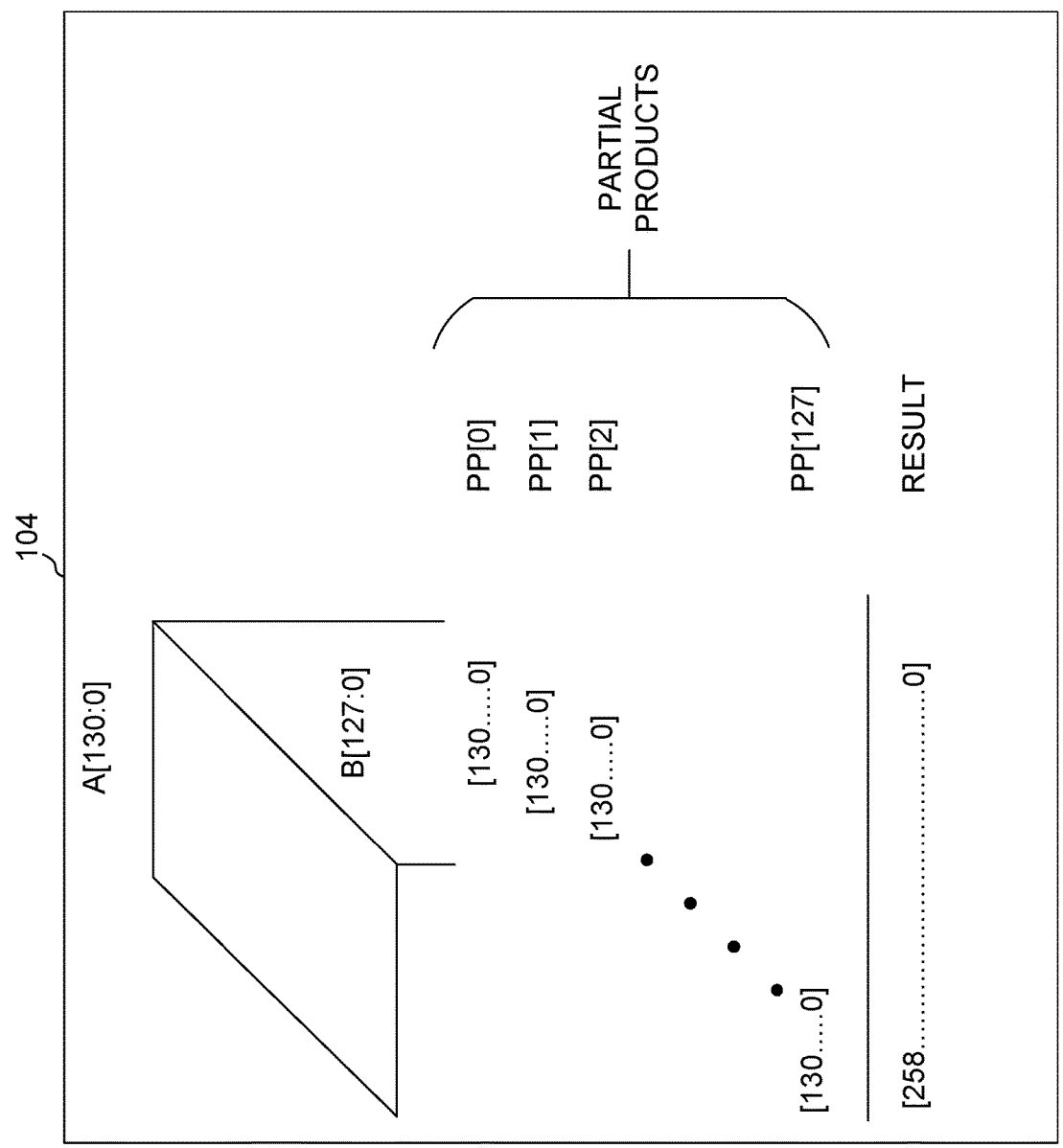
FIG. 2 illustrates example partial products generated by a unified integer and carry-less modular multiplier in accordance with certain embodiments.

FIG. 2 illustrates example partial products generated by unified integer and carry-less modular multiplier 104 in accordance with certain embodiments. In the carry-less and the integer multiplication modes, partial products PP[0]-PP[127] are generated in a similar fashion. PP[0] is generated by performing a binary multiplication of the least significant bit (LSB) of one operand (B) with all of the other bits of the other operand (A). Thus, if B[0] is equal to 1, PP[0] will be equal to A, while if B[0] is equal to 0, PP[0] will be equal to 130'h0 (i.e., a series of 130 zeros). The next partial product (PP[1]) is generated by performing a binary multiplication of B[1] with A. This multiplication also generates 130 bits which are the same value as A or are all zeros depending on the value of B[1], but PP[1] is offset to the left one bit from PP[0]. That is, bit 130 of PP[0] has the same weight (i.e., $2^{139}$) as bit 129 of PP[1], bit 129 of PP[0] has the same weight (i.e., $2^{129}$) as bit 128 of PP[1], and so on. Thus, the most significant bit (MSB) of PP[1] has twice the weight of the MSB of PP[0]. The next partial product (PP[2]) is generated by performing a binary multiplication of B[2] with A. Again, the bits of PP[2] are offset to the left by one bit relative to the previous partial product (PP[1]). The partial products are all generated in this manner until the last partial product is generated by performing a binary multiplication of B[127] with A.

The partial products are summed together to generate the result. Bits having the same weight may be considered as being in the same column. For each column, the bits of the column are summed together and potentially summed with propagating carries from previous columns if the multiplier is operating in the integer multiplication mode. For example, bit 0 (the LSB) of PP[0] becomes bit 0 of the result, the sum of bit 1 of PP[0] and bit 0 of PP[1] is used to generate bit 1 of the result, the sum of bit 2 of PP[0], bit 1 of PP[1], and bit 0 of PP[2] is used to generate bit 2 of the result and so on. When the multiplier is configured to the carry-less mode, the carries are suppressed (e.g., all of the carry outputs may be set to 0) and thus the sum of the bits in a particular column may be equal to an XOR operation performed on all of the bits. When the multiplier is configured to the integer multiplication mode, the carries are allowed to propagate. In various embodiments, this summation may be performed by any suitable circuitry. Example circuitry that may be used to implement the summation of the partial products by multiplier 104 is depicted in FIGS. 3 and 4.

Figure 3:
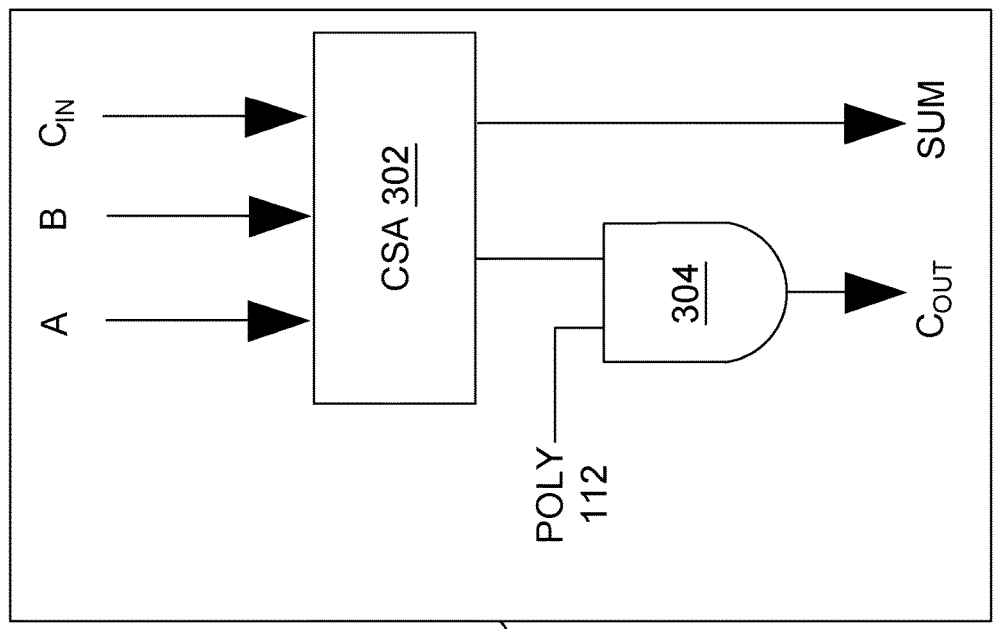
FIG. 3 illustrates an intermediate carry generation circuit in accordance with certain embodiments.

FIG. 3 illustrates an intermediate carry generation circuit 300 in accordance with certain embodiments. Circuit 300 includes a 3:2 carry-save adder (CSA) and an AND gate 304. The CSA includes three inputs, A, B, and $C_{IN}$. Any of these inputs may be coupled to a partial product from a partial product or an output (i.e., sum or carry output ($C_{OUT}$) from another carry-save adder. When the multiplier 104 is in the integer multiplication mode (i.e., the Poly 112 signal is enabled), a bit of $C_{OUT}$ will be set high if at least two corresponding bits of the three inputs (i.e., a corresponding bit of A, a corresponding bit of B, and a corresponding bit of $C_{IN}$) are high. When the multiplier 104 is in the carry-less mode, the bits of $C_{OUT}$ will all be forced low through the AND block 304 (which may represent a plurality of AND gates) irrespective of the values of the inputs, thus suppressing carries throughout the multiplier 104. Each bit of the output "sum" of the CSA 302 may be set high if one or all of the corresponding input bits are high or set low if two or none of the corresponding input bits are high.

In a particular embodiment, a stage of circuits 300 may be used to perform addition of the partial products. For example, a first circuit 300 may receive PP[0], PP[1], and PP[2] as inputs A, B, and $C_{IN}$; a second circuit may receive PP[3], PP[4], and PP[5] as inputs; and so on. The CSAs 302 of these circuits may be different depending on the positions of the partial products and the partial products may be zero padded in some instances so that the inputs to the CSAs are the same width. The outputs of the CSAs 302 may be inputs to an additional stage of circuits 300. Any suitable number of stages of CSAs may be used. Eventually, the last stage may be a single circuit 300 with two outputs (e.g., each of length 258 bits).

Figure 4:
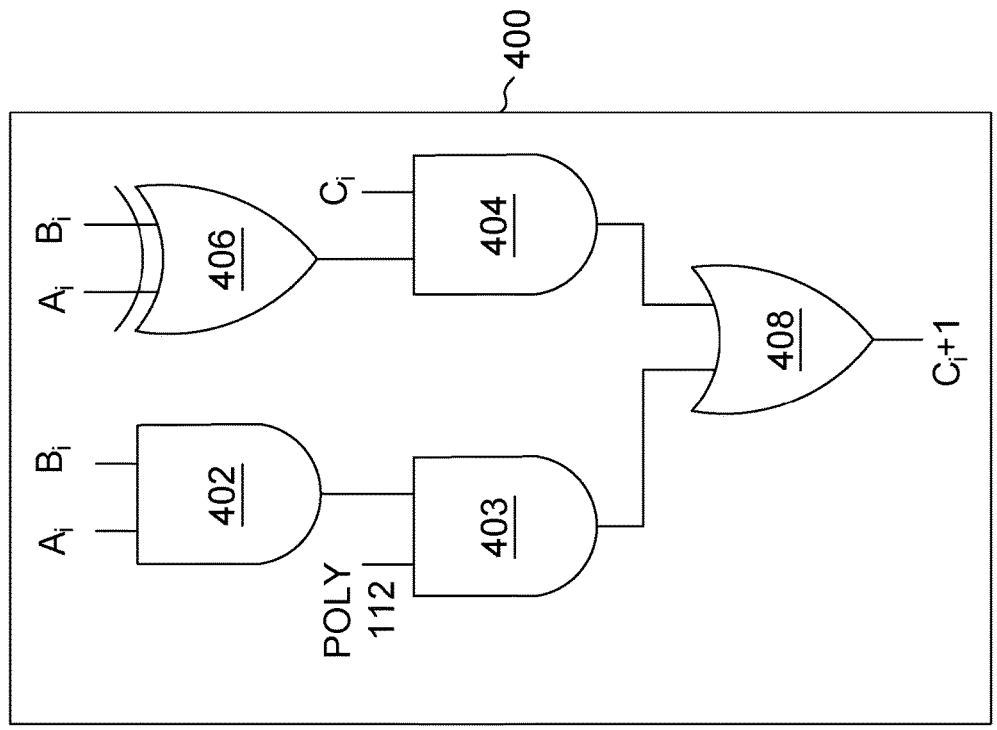
FIG. 4 illustrates a final stage carry propagation circuit in accordance with certain embodiments.

FIG. 4 illustrates a final carry propagation circuit 400 in accordance with certain embodiments. The final carry propagation circuit 400 may be used as part of the operation performed when the two outputs of the circuit 300 of the last stage are to be added. Circuit 400 depicts example circuitry that may be used to determine whether a carry is propagated for each bit position of the two outputs being summed to generate the final result of the multiplier 104.

Final carry propagation circuit 400 includes an AND gate 402 coupled to inputs $A_i$ and $B_i$ ($A_i$ may be a bit from one of the two outputs of the last circuit 300 and $B_i$ may be a corresponding bit from the other output) and an XOR gate 406 coupled to these inputs. Circuit 400 also includes an AND gate 403 coupled to the output of AND gate 402 and the Poly signal 112. Circuit 400 further includes AND gate 404 coupled to the output of XOR gate 406 and $C_i$, which represents the carry result from a similar circuit 400 operating on the previous bit position of the two values being added together to generate the result (i.e., the outputs of the last circuit 300).

When the multiplier 104 is configured in the integer multiplication mode (i.e., Poly signal 112 is high), circuit 400 sets the carry output ($C_i+1$) high if $A_i$ and $B_i$ are both high (regardless of the value of $C_i$) or $C_i$ is high and either of $A_i$ or $B_i$ is high. Again, the carry output $C_i+1$ is suppressed if the multiplier is configured to the carry-less mode (since the low value of Poly signal 112 will pull the output of AND gate 403 low and $C_i$ will necessarily be low because all of the carries are suppressed, pulling the output of AND gate 404 low. The carry output $C_i+1$ is fed to the circuit 400 that is generating the carry for the next bit in a similar manner. The multiplier 104 may also include circuitry to determine what the result of the addition is for each bit. For example, the circuitry may set the result bit high if one or three of $A_i$, $B_i$, and $C_i$ are high, and low otherwise. The carry generation and propagation circuits may be implemented using various architectures depending on the adder architecture and the carry suppression logic in the carry-less mode may be adapted appropriately.

Figure 5:
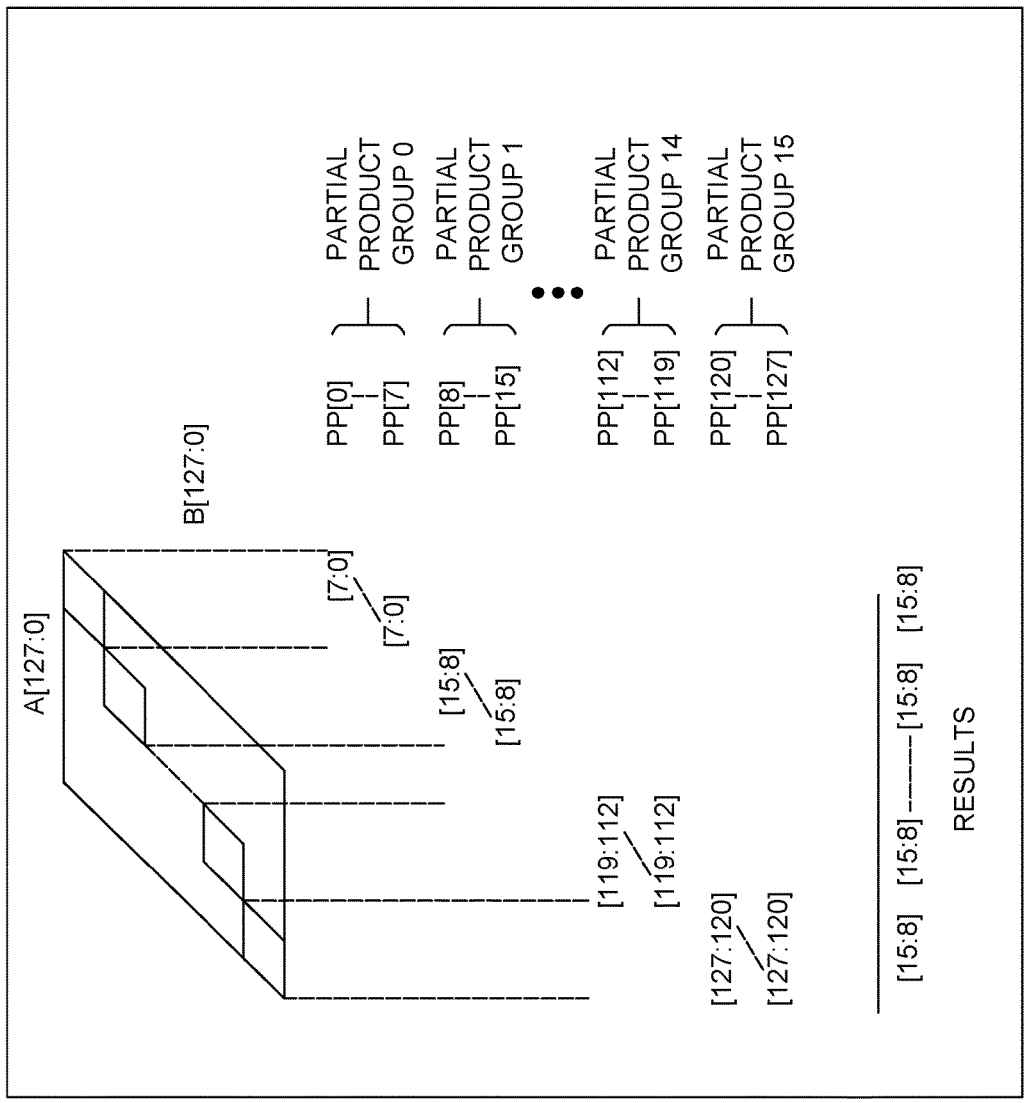
FIG. 5 illustrates example results generated by a unified integer and carry-less modular multiplier in a packed carry-less mode in accordance with certain embodiments.

FIG. 5 illustrates example results generated by a unified integer and carry-less modular multiplier 104 in a packed carry-less multiplication mode in accordance with certain embodiments. As described above, multiplier 104 may also operate in a packed carry-less mode responsive to a value of a configuration parameter, wherein the multiplier 104 performs multiple discrete carry-less multiplications using narrow operands packed within the two wide operands (e.g., the 131-bit operand and the 128-bit operand) provided to the multiplier 104, where a narrow operand has a bit length that is smaller than a wide operand, and a wide operand may include any number of narrow operands. For example, the 128-bit input to the multiplier 104 may include 16 8-bit operands and the 131-bit input to the multiplier may include 16 additional 8-bit operands. In such an example, multiplier 104 may perform 8-bit×8-bit carry-less multiplication, where one 8-bit operand included within the first wide operand is multiplied by a corresponding 8-bit operand included within the second wide operand (in other embodiments, the narrow operands and wide operands may have any suitable number of bits). The 8×8 carry-less multiplication is a key operation in several cryptographic algorithms and error correction codes (ECC).

The unified multiplier 104 may be operated in the packed carry-less multiplier mode by selecting only parts of the partial products corresponding to each pair of 8-bit inputs or other narrow operand width among the entire 128-bit inputs (the extra 3 bits of the 131-bit wide operand may be set to 0 or otherwise ignored) or other wide operand width. These portions of the partial products are then added (or XORed in the packed carry-less mode) separately during the final addition stage to generate 16 parallel unreduced results. If the packed multiplication is modular with a specified polynomial, a reduction circuit (e.g., similar to the GHASH function) may be used after the multiplication to reduce the 16-bit packed results into 8-bit outputs based on the polynomial (or results with other widths into the appropriate output width). In various embodiments, the reduction circuit may be activated responsive to the same value of the configuration parameter that selected the packed carry-less mode for the multiplier 104 or in other suitable manners.

The bitwise multiplication of the packed carry-less multiplier mode may be performed in a manner similar to that described above with respect to the carry-less multiplier mode. That is, a series of partial products PP[0] through PP[127] are generated by iteratively multiplying a bit of one wide operand by the other wide operand. In the packed carry-less multiplier mode, the partial products are organized in groups (i.e., partial product groups 0 through 15) that each correspond to the multiplication of two narrow (e.g., 8-bit) operands (one from each wide operand). For example, partial product group 0 corresponds to the multiplication of A[7:0] and B[7:0], partial product group 1 corresponds to the multiplication of A[15:8] and B[15:8], and so on. For a particular multiplication, only the relevant bits (i.e., bits of the column aligning with the result bits for that particular multiplication) of the corresponding partial product group are included in the summation.

As an example, when the first result (i.e., the result of multiplying A[7:0] and B[7:0] together) is generated, the summation will only include selected bits from partial product group 0. In particular, the summation will only include bits that were generated due to the multiplication of A[7:0] and B[7:0]. Thus, only the least significant 8 bits (i.e., bits 0-7) of each of PP[0] through PP[7] are included in the summation (where each 8 bit group of a respective PP is offset from the 8 bit group of the preceding PP by one bit position) to generate the corresponding 16-bit result (because the operation is carry-less, the MSB of the result may always be 0).

When the second result (i.e., the result of multiplying A[15:8] and B[15:8] is generated, the summation will only include selected bits from partial product group 1. In particular, the summation will only include bits that were generated due to the multiplication of A[15:8] and B[15:8]. Thus, only bits 15 through 8 of each of PP[8] through PP[15] are included in the summation (where each 8 bit group of a respective PP is offset from the 8 bit group of the preceding PP by one bit position) to generate the corresponding 16-bit result.

When the third result (i.e., the result of multiplying A[23:16] and B[23:16] is generated, the summation will only include selected bits from partial product group. In particular, the summation will only include bits that were generated due to the multiplication of A[23:16] and B[23:16]. Thus, only bits 23 through 16 of each of PP[16] through PP[23] are included in the summation (where each 8 bit group of a respective PP is offset from the 8 bit group of the preceding PP by one bit position) to generate the corresponding 16-bit result.

The generation of additional results may be performed in a similar manner. Accordingly, the summations for each result are depicted as smaller parallelograms indicating the bits that are to be summed from the larger parallelogram representing all of the bits of the binary multiplication of the wide operands. When the final result (i.e., the result of multiplying A[127:120] and B[127:120] is generated, the summation will only include selected bits from partial product group 15. In particular, the summation will only include bits that were generated due to the multiplication of A[127:120] and B[127:120]. Thus, only bits 127 through 120 of each of PP[120] through PP[127] are included in the summation (where each 8 bit group of a respective PP is offset from the 8 bit group of the preceding PP by one bit position) to generate the final 16-bit result.

Figure 6:
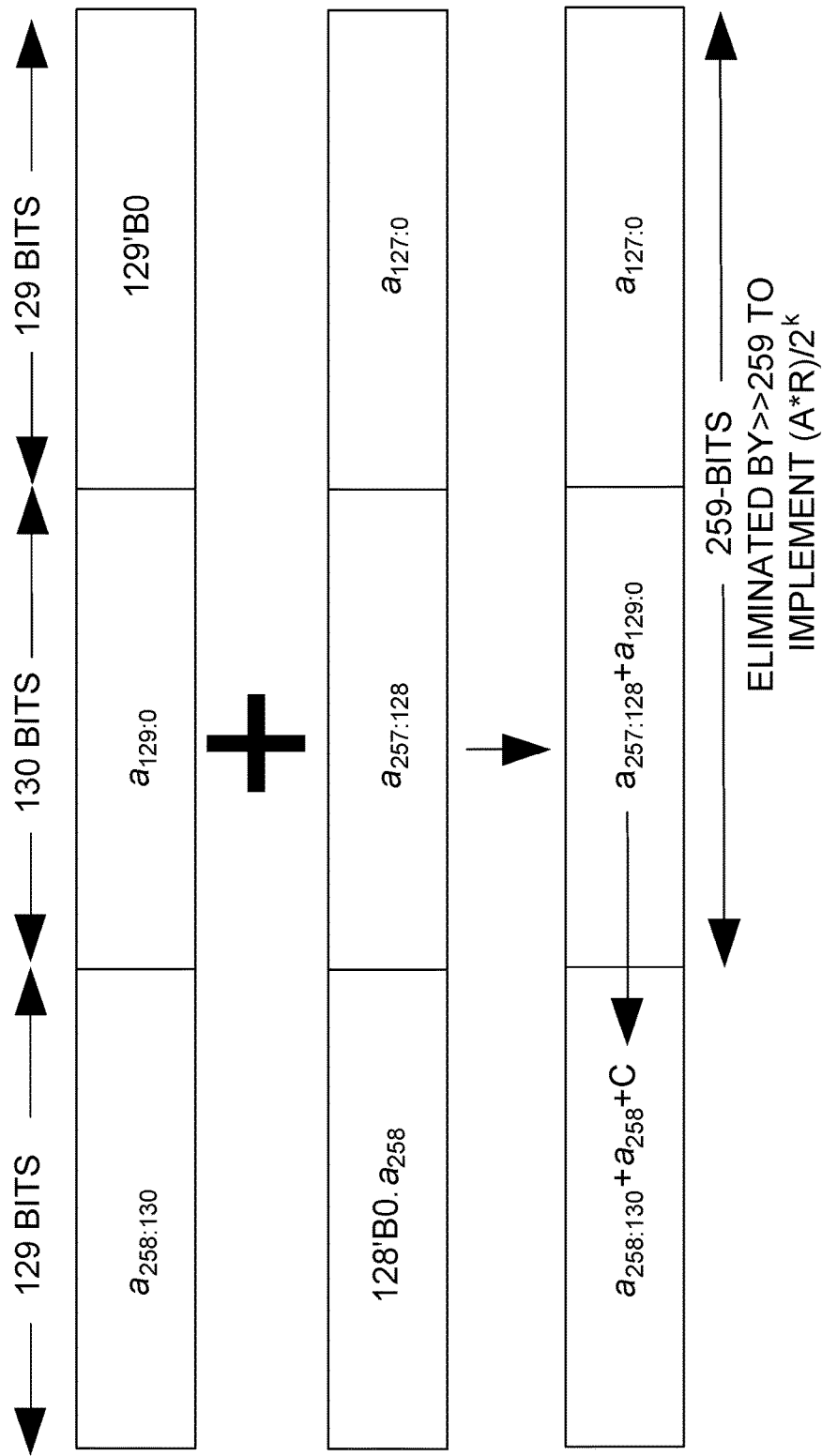
FIG. 6 illustrates an example calculation of a Barrett reduction operation in accordance with certain embodiments.

FIG. 6 illustrates an example calculation of a Barrett reduction technique in accordance with certain embodiments. As described above, when the processor 100 is performing a GHASH function, the output of the multiplier 104 may be reduced by GF reduction circuit 106 using the GCM polynomial $x^{128}+x^7+x^2+x+1$, reduces the 255-bit product output by the multiplier to a 128-bit GHASH value. For this operation, a carry-less Galois Field reduction may be implemented, e.g., by using an XOR tree. However, the integer reduction in Poly1305 involves a more complex operation to reduce the 259-bit product to a 130-bit residue using the prime $2^{130}-5$ (essentially a modulo operation using $2^{130}-5$ is performed). Various embodiments utilize an optimized Barrett reduction circuit for the integer reduction circuit 108 to compute the residue in Poly1305. The techniques, operations, and circuitry described herein may be adapted to implement a Barrett reduction for any suitable modulo operation having a prime number as a divisor.

A Barrett reduction to compute 'a mod m', (where a is the output of the multiplier 104 and may change each iteration, and the divisor m is a prime number, such as $2^{130}-5$) may include the following steps:

a) Select $k$, such that $2^k > a$ b) Pre-compute $r = \left\lfloor \frac{2^k}{m} \right\rfloor$ c) Compute $t = a - \left( \left\lfloor \frac{a \times r}{2^k} \right\rfloor \times m \right)$ d) The residue $a \bmod m = \begin{cases} t, & \text{if } t < m \\ t - m, & \text{otherwise} \end{cases}$ These operations are designed to optimize performance of a modulo operation by replacing divisions (that would normally be performed to calculate the modulo operation) with two multiplications and a wide subtraction (e.g., t−m may involve a 130-bit subtraction). The residue t will be less than m or will only be greater than m by less than m (thus, at most, only one additional subtraction needs to be performed after generating t to determine the result of the modulo operation).

Since, in the case of Poly1305, the product to be reduced (i.e., the output of the multiplier 104) is a 259-bit number, k may be set to 259. Choosing k=259 to satisfy the condition for Barrett reduction results in the pre-computation of:

$$r = \frac{2^{259}}{2^{130}-5},$$

which may be rewritten as $r=2^{129}$ (such notation may convert the multiplication by r into two simple bit shifting operations, since multiplying a value by $2^x$ involves left shifting the value by x bits).

With this notation, $a \times r = a_{258:0} \times (2^{129}+2) = (a_{258:0} \times 2^{129}) + (a_{258:0} \times 2) = (a_{258:0} \cdot 129'b0) + (128'b0 \cdot a_{258:0} \cdot 1'b0)$. The dots represent a concatenation operation. Thus, in the first term, $a_{258:0}$ is followed by 129 bits each set to 0 (representing a shift by 129 bits to implement the multiplication by $2^{129}$, and in the second term, 128 bits set to 0 (to cause the two terms to have the same length) precede $a_{258:0}$, which is followed by a single 0 bit (to implement the multiplication by 2). Dividing this result by $2^k$ (i.e., $2^{259}$), would effectively eliminate the 259 least significant bits of a×r.

This addition, along with the bit shift implementing the division is depicted in FIG. 6. The shift implementing the division causes the least significant 259 bits to be ignored, with the exception of a carry bit that may be generated by the addition of $A_{129:0}$ and $A_{257:128}$, as this bit may affect the LSB of the 129 most significant bits that are preserved after the shift). Thus, the optimized value of $$\left\lfloor \frac{a \times r}{2^k} \right\rfloor = (a_{258:130} + a_{258} + c),$$

where 'c' is the carry generated by the addition of ($a_{257:128}$+ $a_{129:0}$). In an optimized Barrett reduction circuit of a particular embodiment, this calculation may replace a wide multiplication (i.e., a multiplication between two wide operands), thus improving performance and reducing logic area.

Figure 7:
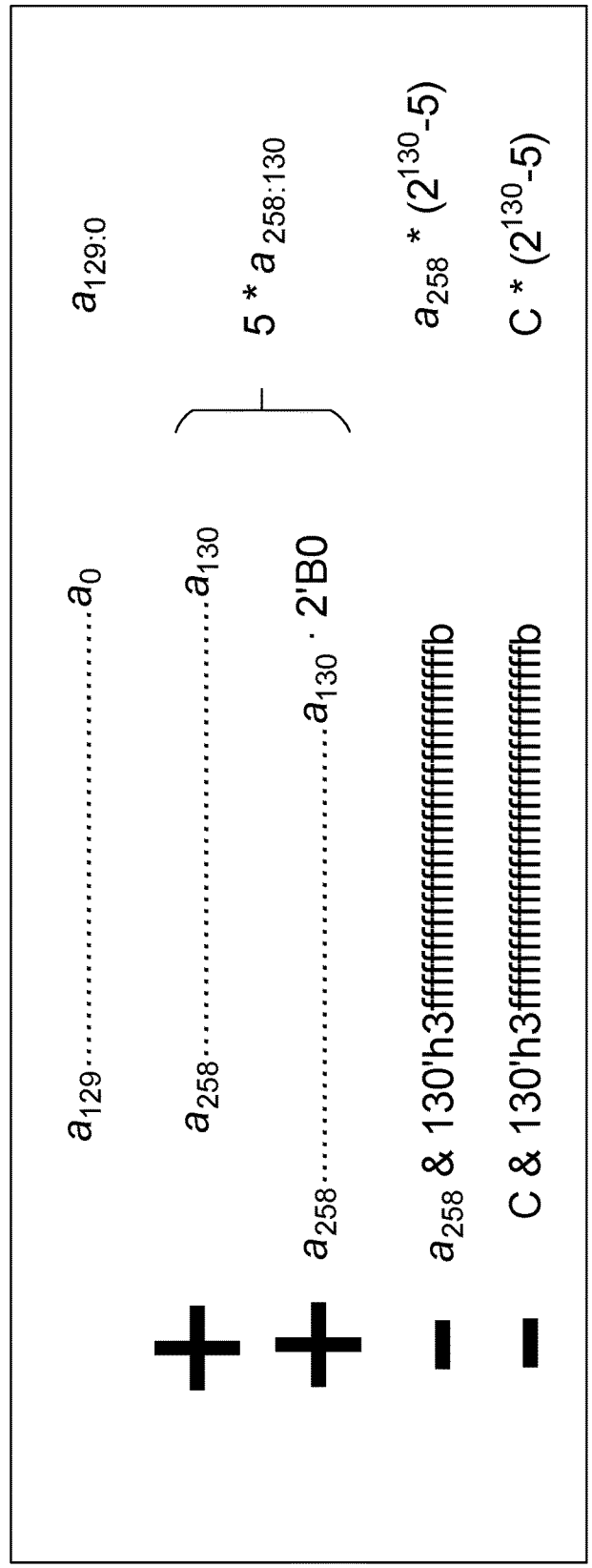
FIG. 7 illustrates another example calculation of a Barrett reduction operation in accordance with certain embodiments.

Substituting the value above into the equation for Barrett Reduction, $t=a-[(a_{258:130}+a_{258}+c)\times m]=a-[(a_{258:130}+a_{258}+c)\times(2^{130}-5)]=[a-(a_{258:130}\times 2^{130})]+(a_{258:130}\times 5)-[a_{258}\times(2^{130}-5)]-[c\times(2^{130}-5)]$. The term $[a-(a_{258:130}\times 2^{130})]=a-(a_{258:130}\cdot 129'b0)=a_{129:0}$, reducing the overall computation of t to the computation shown in FIG. 7. That is, $t=a_{129:0}+a_{258:130}+a_{258:130}\cdot 2'b0-(a_{258}$ & 130'h3ffffffffffffffffffffffffffffffb)−(c & 130'h3ffffffffffffffffffffffffffffffb). An example circuit implementing this calculation is depicted in FIG. 8.

Figure 8:
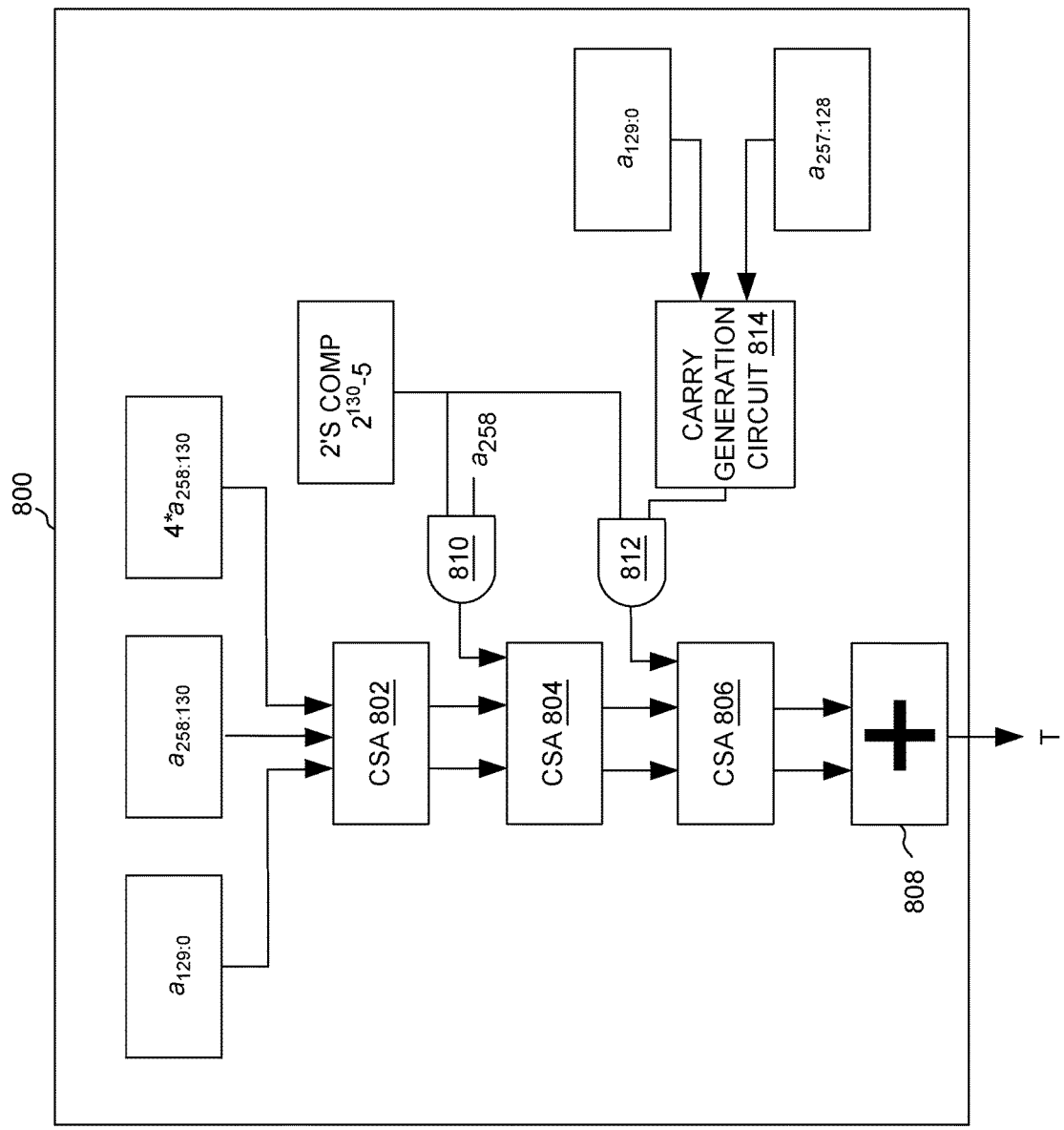
FIG. 8 illustrates a Barrett reduction circuit in accordance with certain embodiments.

FIG. 8 illustrates a Barrett reduction circuit 800 in accordance with certain embodiments. Circuit 800 includes three 3:2 carry-save adders (CSA) 802, 804, 806, an adder 808 (e.g., a full adder), two AND gate blocks 810 and 812, and a carry generation circuit 814. CSA 802 adds $a_{129:0}$ and $5*a_{258:130}$ (corresponding to $a_{258:130}+a_{258:130}\cdot 2'b0$ from above) together. It does this by adding $a_{129:0}$ to $a_{258:130}$ and $4*a_{258:130}$. The two outputs of CSA 802 are passed to CSA 804 along with the output of AND gate block 810, which performs an AND operation between $a_{258}$ and a two's complement representation of $2^{130}-5$ (to implement the term $-(a_{258}$ & 130'h3ffffffffffffffffffffffffffffffb) from above). The two outputs of CSA 804 are passed to CSA 806 along with the output of AND gate block 812, which performs an AND operation between a result bit of the carry generation circuit 814 and the two's complement representation of $2^{130}-5$ (to implement the term −(c & 130'h3ffffffffffffffffffffffffffffffb) from above). The carry generation circuit 814 performs a carry generate/propagate operation for the addition of $a_{129:0}$ and $a_{257:128}$ to determine whether a carry is generated at the MSB of the addition (i.e., when $a_{129}$ is added to $a_{257}$ and a carry bit from addition performed at the previous bit position). This carry bit is then ANDed with the two's complement representation of $2^{130}-5$ and then provided to CSA 806. Adder 808 then adds these values together to generate t. Although not shown, the residue t is then compared with the prime $2^{130}-5$ and is followed by a conditional subtraction (i.e., $2^{130}-5$ is subtracted from the residue if the residue is greater than $2^{130}-5$) to produce the final reduced output of the modulo operation. The optimized Barrett reduction described above requires only two wide additions: a 130-bit carry generation to compute the carry bit 'c' and a 131-bit addition to compute the final t and does not require any multiplications to be performed.

Although a particular embodiment is depicted, the operations and circuitry described above may be adapted to perform optimized Barrett reductions with prime divisors other than $2^{130}-5$. Moreover, other embodiments may include different circuitry to implement the disclosed operations. For example, circuit 800 may be implemented using 4:2 CSAs instead of 3:2 CSAs. As another example, circuit 800 may be implemented by a portion (e.g., an Arithmetic Logic Unit) of a processor core that is utilized in response to a software instructions (e.g., instructions requesting an add operation) specifying the additions performed by circuit 800.

Figure 9:
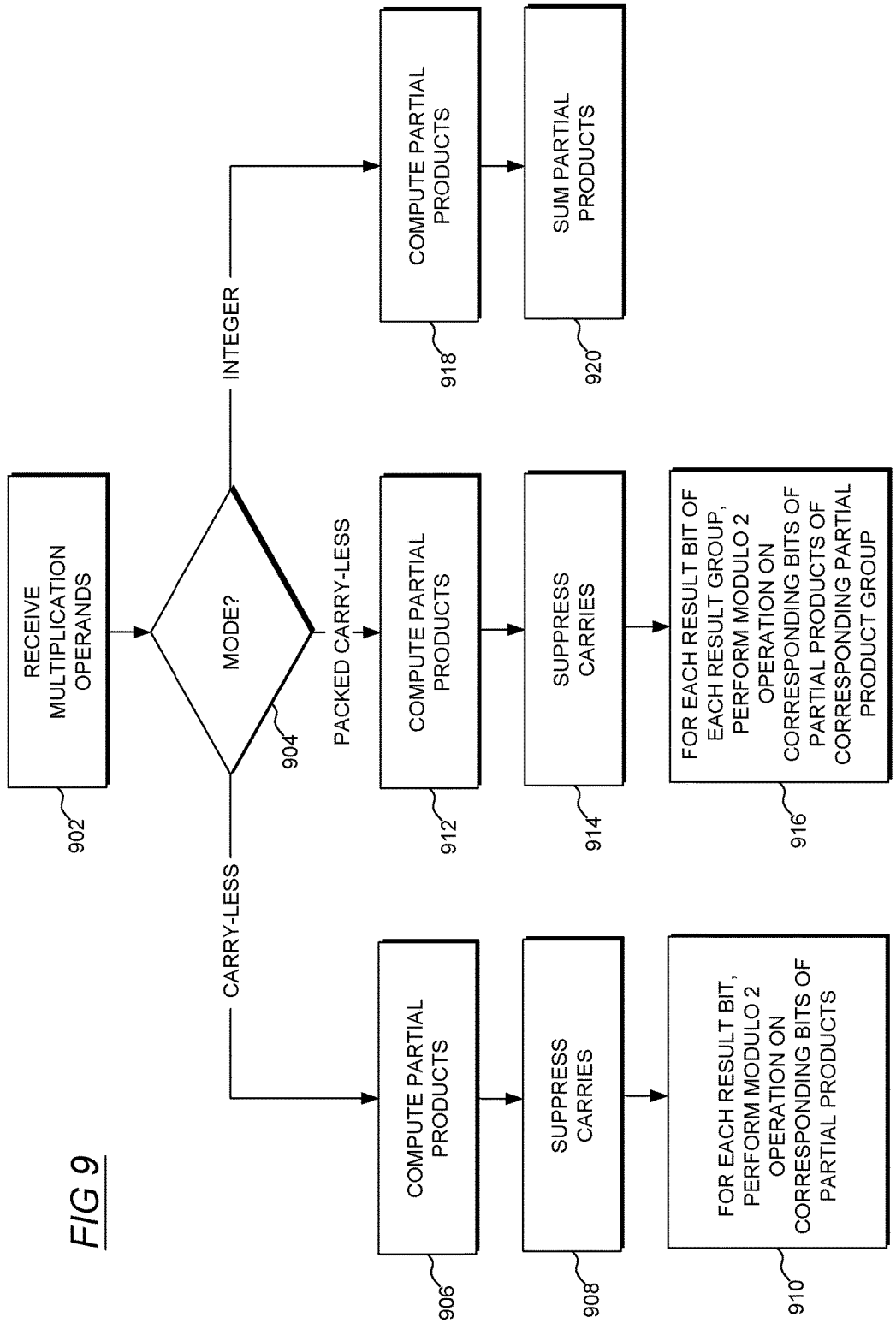
FIG. 9 illustrates an example flow for performing a multiplication based on a selected mode of a unified multiplier in accordance with certain embodiments.

FIG. 9 illustrates an example control flow for performing a multiplication based on a selected mode of a unified multiplier 104 in accordance with certain embodiments. At 902, multiplication operands are received at multiplier 104. For example, two wide operands are received at multiplier 104. A wide multiplication operand may have any suitable width. In a particular embodiment, a first wide operand has a width of 128-bits and a second wide operand has a width of 131-bits (in some situations only 128-bits of the 131-bit are valid).

At 904, a mode of the multiplier 104 is determined. In a particular embodiment, the mode is determined based on the value of a configuration parameter. In the embodiment depicted, when the configuration parameter specifies a first value, the mode is integer multiplication; when the configuration parameter specifies a second value, the mode is carry-less multiplication; and when the mode specifies a third value, the mode is packed carry-less multiplication. As an example, the configuration parameter may be a two-bit signal, and the first value may be "00", the second value may be "01", and the third value may be "10", though the different values may be represented in any suitable manner.

If the mode is carry-less multiplication, the flow moves to 906, where a plurality of partial products are computed by the multiplier. For example, each partial product may be computed by multiplying a bit of the second wide operand by the entire first operand. At 908, carries are suppressed for a summation operation to be performed on the partial products. The carry-less summation operation is then performed at 910 by performing a modulo 2 operations on corresponding bits of partial products to generate result bits. For example, the partial products generated by a 128-bit× 128-bit multiplication may create partial products that span 255 bits, where each bit may be considered to correspond to a column comprising a bit from one or more of the partial products. For each column, if the column includes an odd number of bits set to 1, the corresponding result bit is set to 1 (and set to 0 if the column includes an even number of bits set to 1). The modulo 2 operations may be performed by adders that are also capable of generating carry bits, however, these carry bits are suppressed (e.g., set to 0) during the carry-less summation operation.

If the mode is packed carry-less multiplication, the flow moves to 912, where partial products are computed in a manner similar to that described above. At 914, carries are suppressed in a manner similar to that above. At 916, for each result bit of each result group (e.g., a series of adjacent bits in the output result), a module 2 operation is performed on corresponding bits of partial products of a corresponding partial product group in a manner similar to that described above with respect to FIG. 5. Each result group corresponds to a result of a multiplication between a narrow operand of one of the wide operands and a narrow operand of the other wide operand.

If the mode is integer multiplication, the flow moves to 918 where the partial products are computed in a manner similar to that described above. The partial products are summed at 920. During this summation, the carries are not suppressed, but are allowed to propagate. The result is a binary representation of the integer result of the multiplication.

Some of the blocks illustrated in FIG. 9 may be repeated, combined, modified or deleted where appropriate, and additional blocks may also be added to the flowchart. Additionally, blocks may be performed in any suitable order without departing from the scope of particular embodiments.

The figures below detail exemplary architectures and systems to implement embodiments of the above. For example, the functionality or architecture of processor 100 (or variations thereof described herein) may be implemented by any of the processors described below or as an additional processor in any of the systems described below. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 10A is a block diagram illustrating both an exemplary in-order pipeline and an exemplary register renaming, out-of-order issue/execution pipeline according to embodiments of the disclosure. FIG. 10B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression and/or decompression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11B:
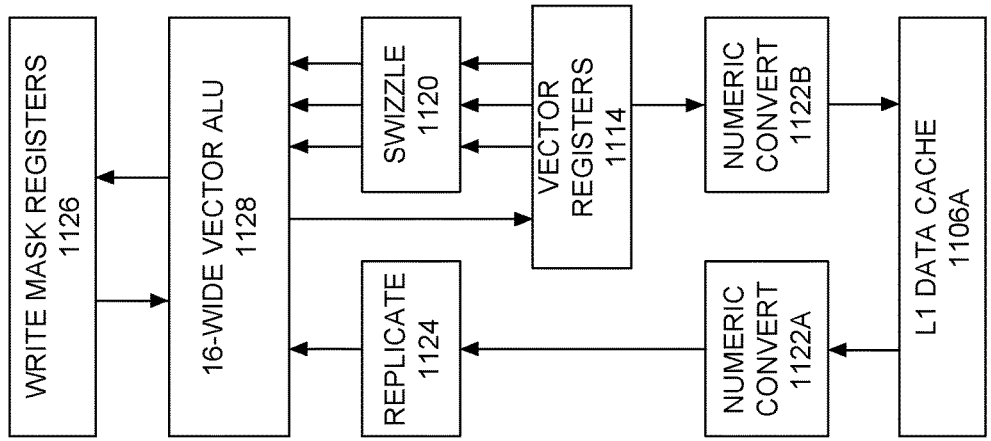
FIGS. 11A-B illustrate a block diagram of a more specific exemplary in-order core architecture, which core would be one of several logic blocks (potentially including other cores of the same type and/or different types) in a chip in accordance with certain embodiments.
Figure 11A:
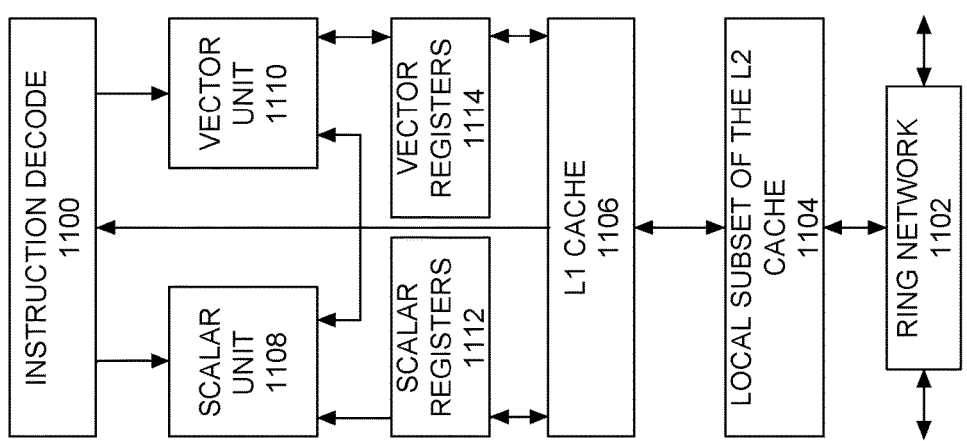

FIGS. 11A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to various embodiments. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments may use a different approach (e.g., use a single register set or include a communication path that allow data to be transferred between the two register files without being written and read back).

The local subset of the L2 cache 1104 is part of a global L2 cache that is divided into separate local subsets (in some embodiments one per processor core). Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 11B is an expanded view of part of the processor core in FIG. 11A according to embodiments. FIG. 11B includes an L1 data cache 1106A (part of the L1 cache 1106), as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
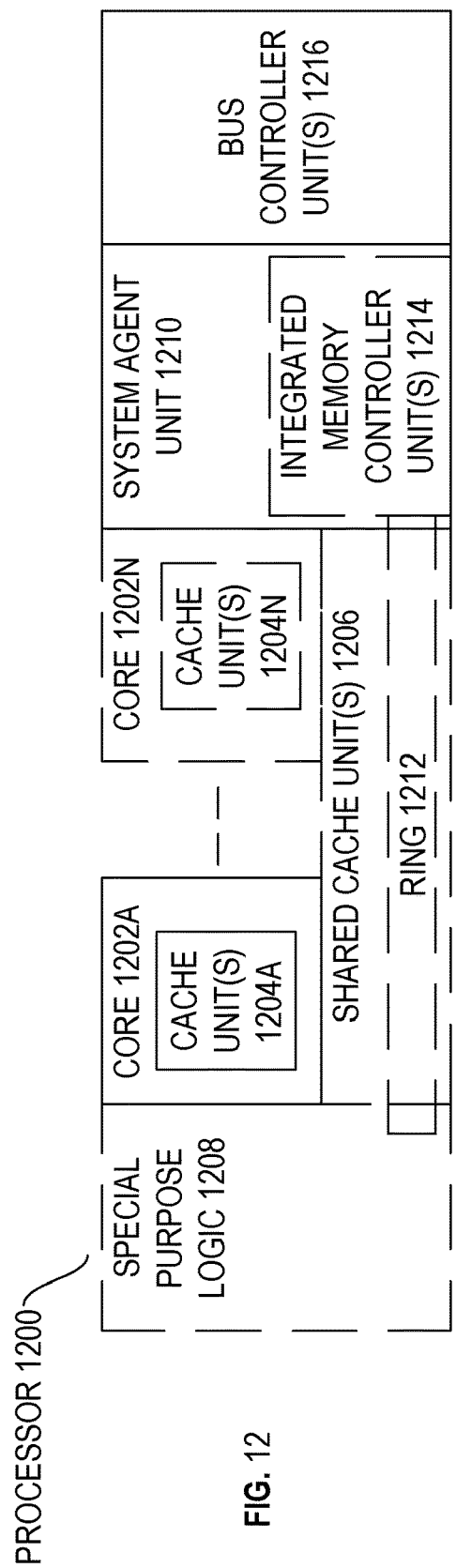
FIG. 12 is a block diagram of a processor that may have more than one core, may have an integrated memory controller, and may have integrated graphics in accordance with certain embodiments.

FIG. 12 is a block diagram of a processor 1200 that may have more than one core, may have an integrated memory controller, and may have integrated graphics according to various embodiments. The solid lined boxes in FIG. 12 illustrate a processor 1200 with a single core 1202A, a system agent 1210, and a set of one or more bus controller units 1216; while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, or a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1200 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the special purpose logic (e.g., integrated graphics logic) 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the special purpose logic 1208. The display unit is for driving one or more externally connected displays.

The cores 1202A-N may be homogenous or heterogeneous in terms of architecture instruction set; that is, two or more of the cores 1202A-N may be capable of executing the same instruction set, while others may be capable of executing only a subset of that instruction set or a different instruction set.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 13:
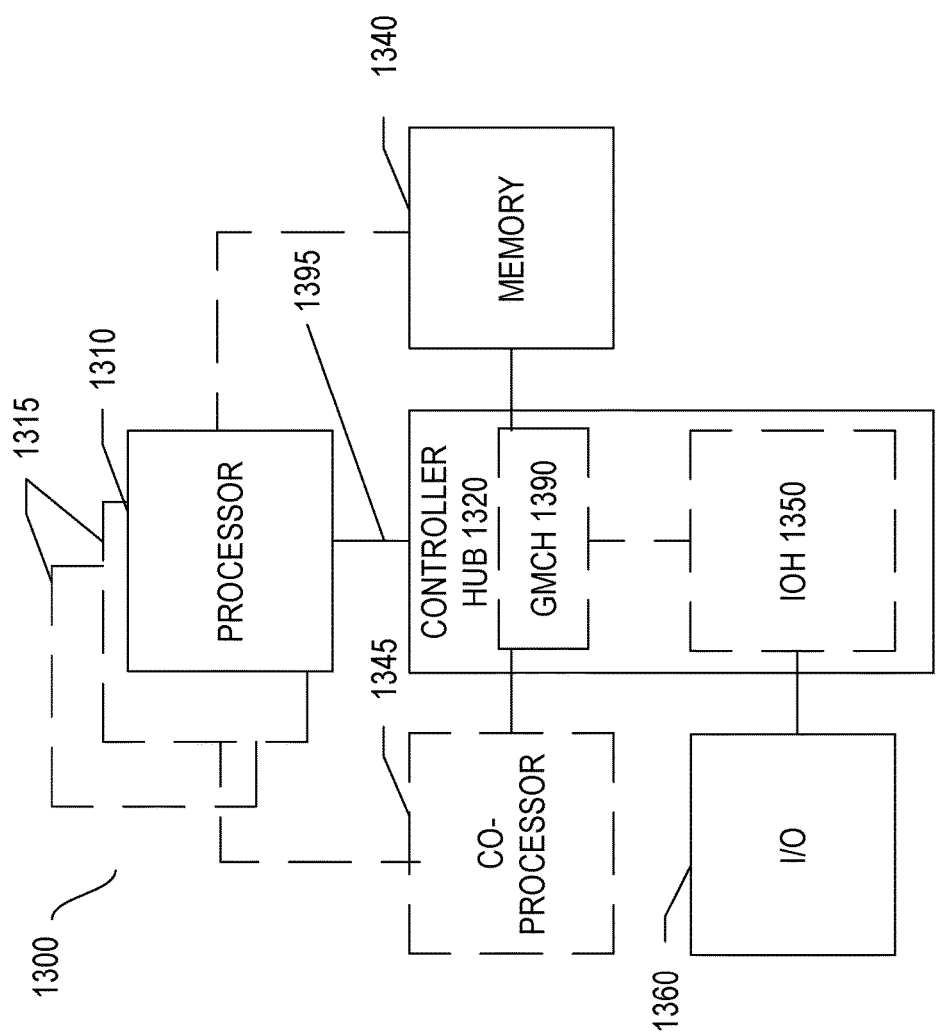
FIGS. 13, 14, 15, and 16 are block diagrams of exemplary computer architectures in accordance with certain embodiments.

FIG. 13 depicts a block diagram of a system 1300 in accordance with one embodiment of the present disclosure. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips or the same chip); the GMCH 1390 includes memory and graphics controllers coupled to memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 is a single chip comprising the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), other suitable memory, or any combination thereof. The memory 1340 may store any suitable data, such as data used by processors 1310, 1315 to provide the functionality of computer system 1300. For example, data associated with programs that are executed or files accessed by processors 1310, 1315 may be stored in memory 1340. In various embodiments, memory 1340 may store data and/or sequences of instructions that are used or executed by processors 1310, 1315.

In at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression and/or decompression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
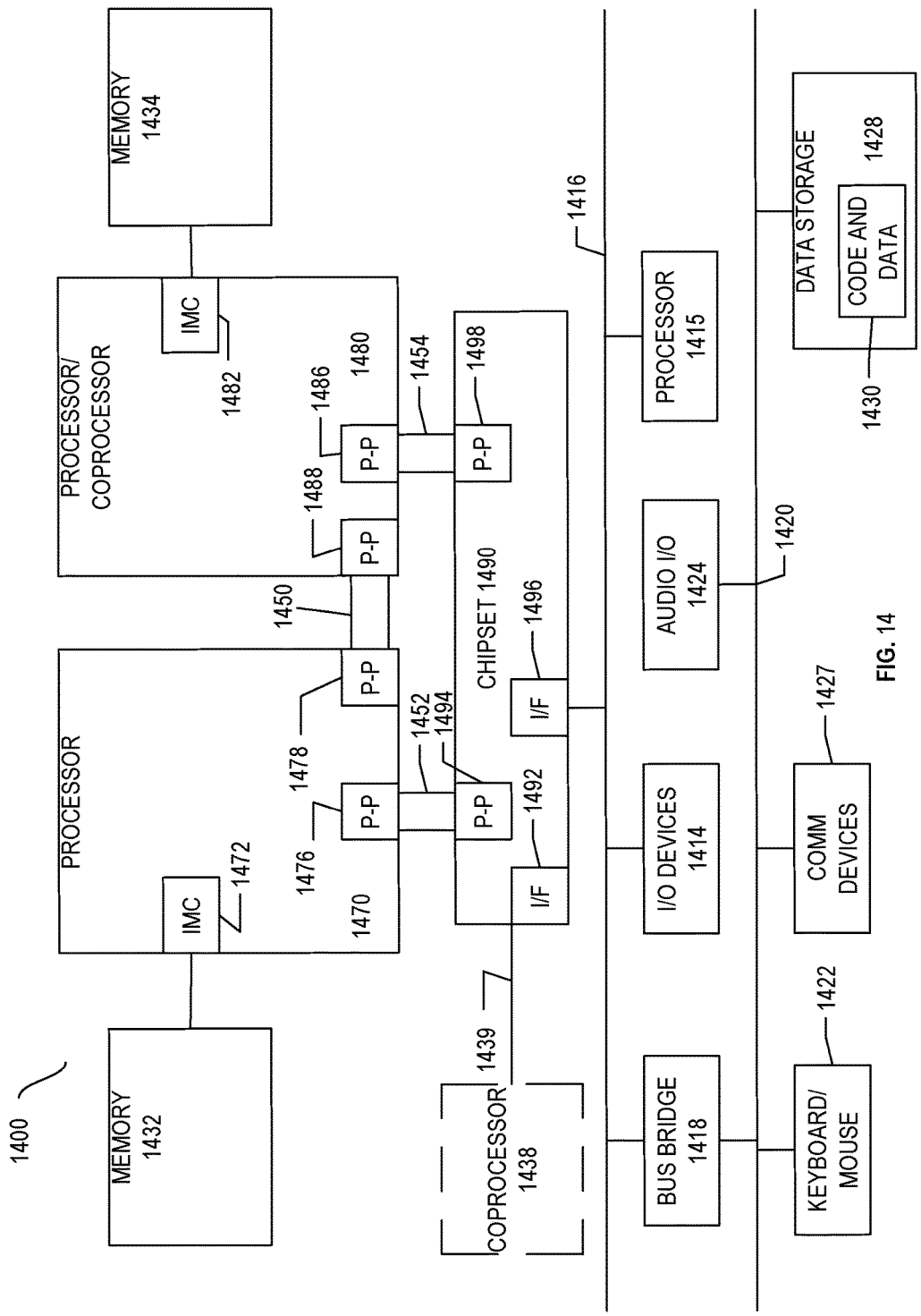

FIG. 14 depicts a block diagram of a first more specific exemplary system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the disclosure, processors 1470 and 1480 are respectively processors 1310 and 1315, while coprocessor 1438 is coprocessor 1345. In another embodiment, processors 1470 and 1480 are respectively processor 1310 and coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are contemplated by this disclosure. For example, instead of the point-to-point architecture of FIG. 14, a system may implement a multi-drop bus or other such architecture.

Figure 15:
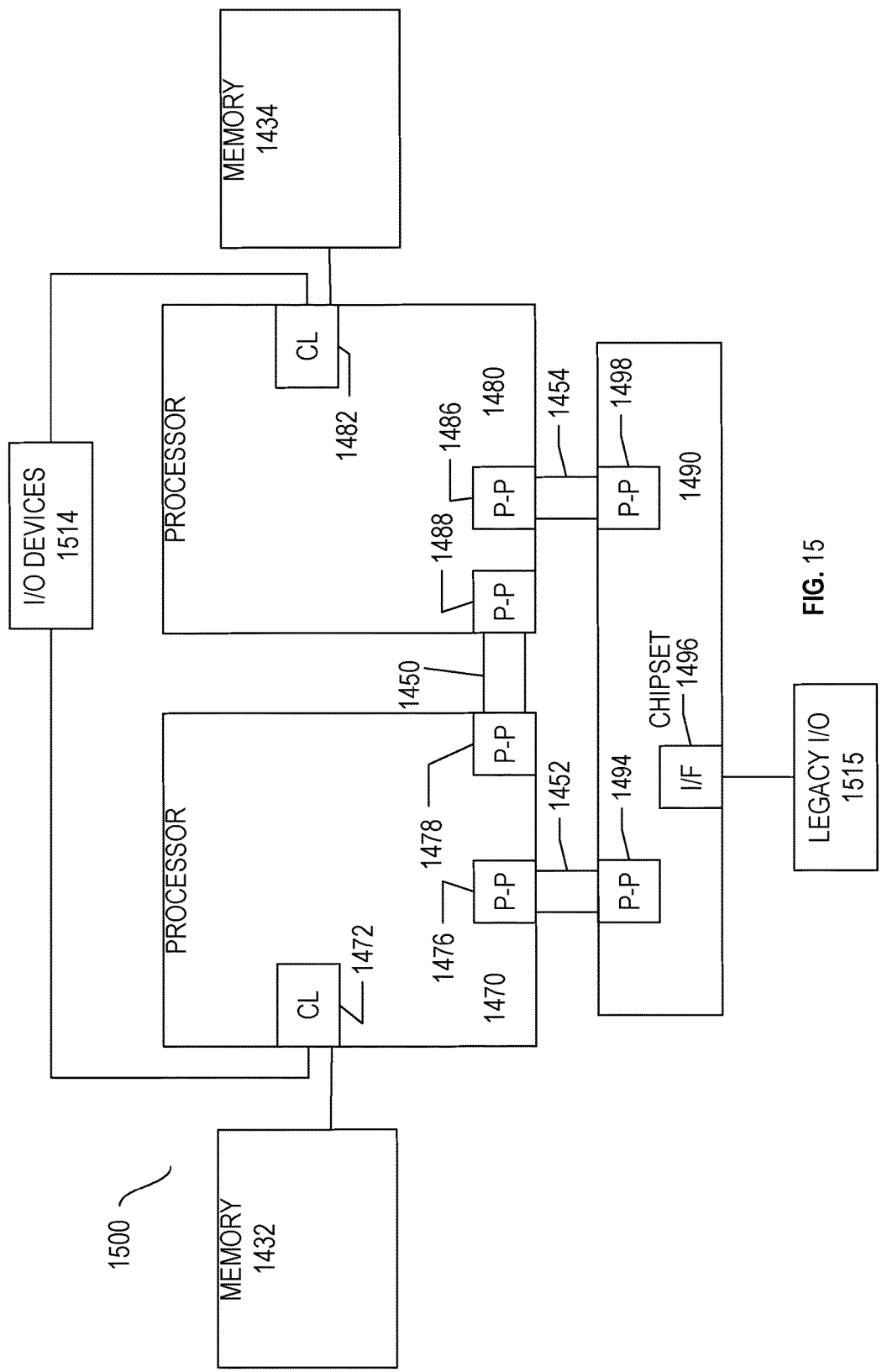

FIG. 15 depicts a block diagram of a second more specific exemplary system 1500 in accordance with an embodiment of the present disclosure. Similar elements in FIGS. 14 and 15 bear similar reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
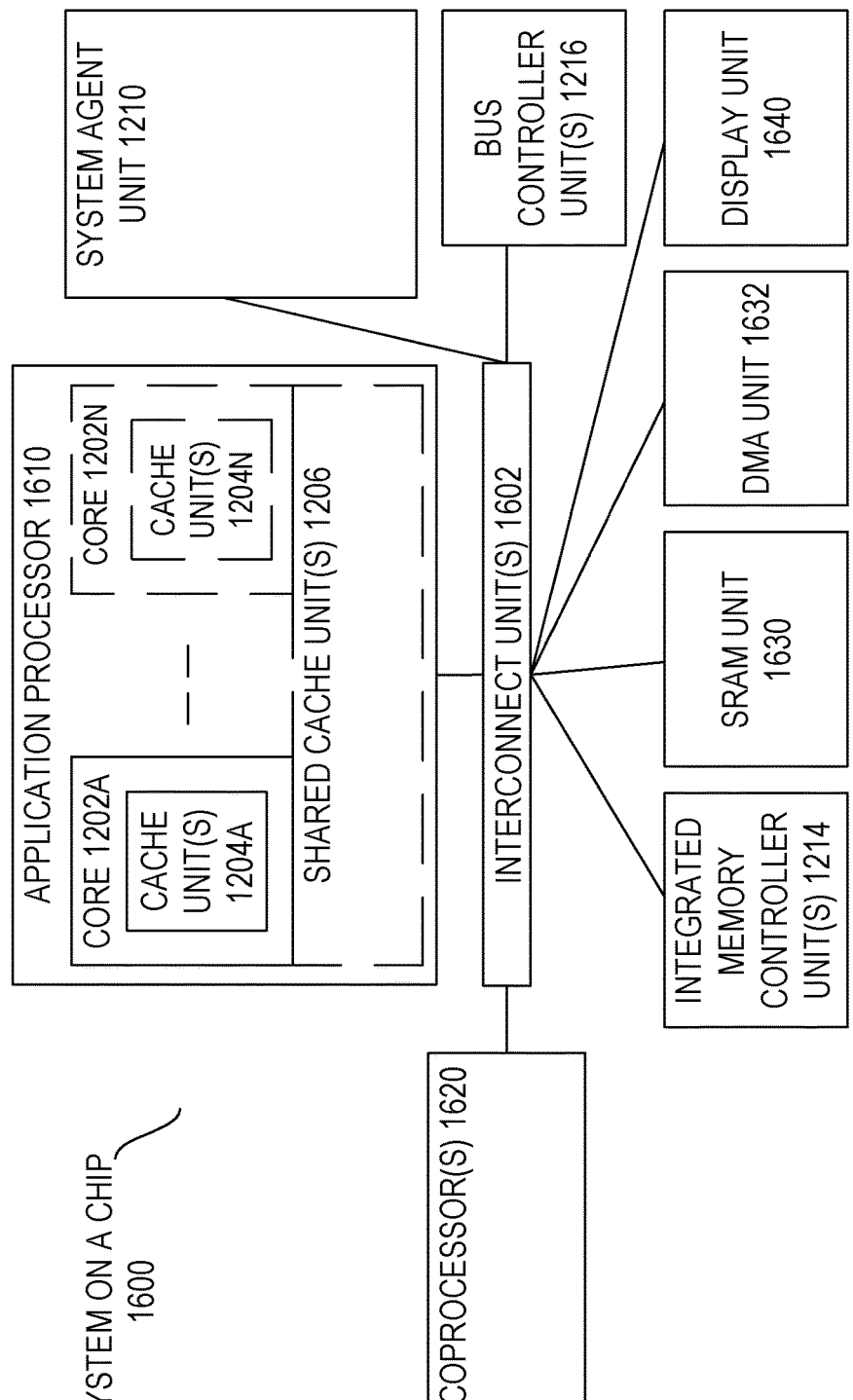

FIG. 16 depicts a block diagram of a SoC 1600 in accordance with an embodiment of the present disclosure. Similar elements in FIG. 12 bear similar reference numerals. Also, dashed lined boxes are optional features on more advanced SoCs. In FIG. 16, an interconnect unit(s) 1602 is coupled to: an application processor 1610 which includes a set of one or more cores 1202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as processor 100, multiplier 104, reduction circuit 106, reduction circuit 108, other component described herein, or any subcomponent of any of these components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a multiplier circuit to operate in an integer multiplication mode responsive to a first value of a configuration parameter; and operate in a carry-less multiplication mode responsive to a second value of the configuration parameter.

In an embodiment, the multiplier circuit is to comprise a plurality of adders to sum a plurality of partial products, wherein carry outputs of the adders are propagated responsive to the first value of the configuration parameter and suppressed responsive to the second value of the configuration parameter. In an embodiment, the multiplier circuit is to perform an integer multiplication of a first authenticated encryption algorithm responsive to the first value of the configuration parameter and to perform a carry-less multiplication of a second authenticated encryption algorithm responsive to the second value of the configuration parameter. In an embodiment, the first authenticated encryption algorithm is Poly1305 and the second authenticated encryption algorithm is Advanced Encryption Standard (AES)-Galois/Counter Mode (GCM). In an embodiment, the multiplier circuit is to operate in a packed carry-less multiplication mode responsive to a third value of the configuration parameter. In an embodiment, a processor further comprises a first reduction circuit to reduce a first output of the multiplier circuit responsive to the first value of the configuration parameter; and a second reduction circuit to reduce a second output of the multiplier circuit responsive to the second value of the configuration parameter. In an embodiment, the first reduction circuit is to reduce the first output of the multiplier circuit by performing a modulo operation using a prime number as a divisor and the second reduction circuit is to reduce the second output of the multiplier circuit based on a first polynomial. In an embodiment, a processor further comprises a reduction circuit to perform a modulo operation on an output of the multiplier circuit, wherein the modulo operation includes, in part, adding a first segment of an output of the multiplier circuit to a second segment of the output of the multiplier circuit. In an embodiment, the reduction circuit is a processor core to execute a software instruction to add the first segment of the output of the multiplier circuit to the second segment of the output of the multiplier circuit.

In at least one embodiment, a method comprises operating a multiplier in an integer multiplication mode responsive to a first value of a configuration parameter; and operating the multiplier in a carry-less multiplication mode responsive to a second value of the configuration parameter.

In an embodiment, a method further comprises summing, by a plurality of adders, a plurality of partial products, wherein carry outputs of the adders are propagated responsive to the first value of the configuration parameter and suppressed responsive to the second value of the configuration parameter. In an embodiment, a method further comprises performing an integer multiplication of a first authenticated encryption algorithm responsive to the first value of the configuration parameter and performing a carry-less multiplication of a second authenticated encryption algorithm responsive to the second value of the configuration parameter. In an embodiment, the first authenticated encryption algorithm is Poly1305 and the second authenticated encryption algorithm is Advanced Encryption Standard (AES)-Galois/Counter Mode (GCM). In an embodiment, a method further comprises operating the multiplier in a packed carry-less multiplication mode responsive to a third value of the configuration parameter. In an embodiment, a method further comprises reducing, by a first reduction circuit, a first output of the multiplier circuit responsive to the first value of the configuration parameter; and reducing, by a second reduction circuit, a second output of the multiplier circuit responsive to the second value of the configuration parameter. In an embodiment, a method further comprises reducing, by the first reduction circuit, the first output of the multiplier circuit by performing a modulo operation using a prime number as a divisor and reducing, by the second reduction circuit, the second output of the multiplier circuit based on a first polynomial. In an embodiment, a method further comprises performing, by a reduction circuit, a modulo operation on an output of the multiplier circuit, wherein the modulo operation includes, in part, adding a first segment of an output of the multiplier circuit to a second segment of the output of the multiplier circuit. In an embodiment, the reduction circuit is a processor core to execute a software instruction to add the first segment of the output of the multiplier circuit to the second segment of the output of the multiplier circuit. In an embodiment, the modulo operation is a Barrett reduction. In an embodiment, the reduction circuit further comprises a carry generation circuit, and wherein the modulo operation includes utilizing the carry generation circuit to enable a single bit output responsive to a carry generated at a most significant bit of a binary addition of two different segments of the output of the multiplier circuit.

In at least one embodiment, a system comprises means for operating a multiplier circuit in an integer multiplication mode responsive to a first value of a configuration parameter; and means for operating the multiplier circuit in a carry-less multiplication mode responsive to a second value of the configuration parameter.

In an embodiment, a system comprises means to sum a plurality of partial products, wherein carry outputs of the means to sum are propagated responsive to the first value of the configuration parameter and suppressed responsive to the second value of the configuration parameter. In an embodiment, a system comprises means for performing an integer multiplication of a first authenticated encryption algorithm responsive to the first value of the configuration parameter and means for performing a carry-less multiplication of a second authenticated encryption algorithm responsive to the second value of the configuration parameter. In an embodiment, the first authenticated encryption algorithm is Poly1305 and the second authenticated encryption algorithm is Advanced Encryption Standard (AES)-Galois/Counter Mode (GCM). In an embodiment, a system comprises means for operating the multiplier circuit in a packed carry-less multiplication mode responsive to a third value of the configuration parameter. In an embodiment, a system comprises means for reducing a first output of the multiplier circuit responsive to the first value of the configuration parameter; and means for reducing a second output of the multiplier circuit responsive to the second value of the configuration parameter. In an embodiment, a system comprises means for reducing the first output of the multiplier circuit by performing a modulo operation using a prime number as a divisor and reducing the second output of the multiplier circuit based on a first polynomial. In an embodiment, a system comprises means for performing a modulo operation on an output of the multiplier circuit, wherein the modulo operation includes, in part, adding a first segment of an output of the multiplier circuit to a second segment of the output of the multiplier circuit. In an embodiment, the means for reducing is a processor core to execute a decoded instruction to add the first segment of the output of the multiplier circuit to the second segment of the output of the multiplier circuit. In an embodiment, the modulo operation is a Barrett reduction. In an embodiment, the means for reducing comprises a carry generation circuit, wherein the modulo operation includes utilizing the carry generation circuit to enable a single bit output responsive to a carry generated at a most significant bit of a binary addition of two different segments of the output of the multiplier circuit.

In at least one embodiment, a system comprises a system memory; and a processor coupled to the system memory, the processor comprising a multiplier circuit to operate in an integer multiplication mode responsive to a first value of a configuration parameter; and operate in a carry-less multiplication mode responsive to a second value of the configuration parameter.

In an embodiment, a system further comprises a memory controller to transfer the configuration parameter from the system memory to the processor. In an embodiment, a system further comprises a network interface controller to communicate an authentication signature and associated data to a network, the authentication signature generated at least in part by the multiplier circuit. In an embodiment, the multiplier circuit to operate in a packed carry-less multiplication mode responsive to a third value of the configuration parameter. In an embodiment, the multiplier circuit to comprise a plurality of adders to sum a plurality of partial products, wherein carry outputs of the adders are propagated responsive to the first value of the configuration parameter and suppressed responsive to the second value of the configuration parameter.

In at least one embodiment, a method comprises operating a multiplier circuit in an integer multiplication mode responsive to a first value of a configuration parameter; and operating a multiplier circuit in a carry-less multiplication mode responsive to a second value of the configuration parameter.

In an embodiment, a method further comprises transferring, by a memory controller, the configuration parameter from a system memory to a processor comprising the multiplier circuit. In an embodiment, a method further comprises communicating, by a network interface controller, an authentication signature and associated data to a network, the authentication signature generated at least in part by the multiplier circuit. In an embodiment, a method further comprises operating the multiplier circuit in a packed carry-less multiplication mode responsive to a third value of the configuration parameter. In an embodiment, a method further comprises summing, by a plurality of adders, a plurality of partial products, wherein carry outputs of the adders are propagated responsive to the first value of the configuration parameter and suppressed responsive to the second value of the configuration parameter.

In at least one embodiment, a processor comprises a multiplier circuit to perform an integer multiplication; and a reduction circuit to perform a modulo operation on an output of the multiplier circuit, wherein the modulo operation includes adding a first segment of an output of the multiplier circuit to a second segment of the output of the multiplier circuit.

In an embodiment, the modulo operation is a Barrett reduction. In an embodiment, the reduction circuit is a processor core to execute a decoded instruction to add the first segment of the output of the multiplier circuit with the second segment of the output. In an embodiment, the reduction circuit further comprising a carry generation circuit, wherein the modulo operation includes utilizing the carry generation circuit to enable a single bit output responsive to a carry generated at a most significant bit of a binary addition of two different segments of the output of the multiplier circuit. In an embodiment, the reduction circuit further is to perform an AND operation between the single bit output of the carry generation circuit and a representation of a prime number that is a divisor of the modulo operation. In an embodiment, the modulo operation includes performance of an AND operation between a single bit of the output of the multiplier circuit and a representation of a prime number that is a divisor of the modulo operation.

In at least one embodiment, a method comprises performing, by a multiplier circuit, an integer multiplication; and performing, by a reduction circuit, a modulo operation on an output of the multiplier circuit, wherein the modulo operation includes adding a first segment of an output of the multiplier circuit to a second segment of the output of the multiplier circuit.

In an embodiment, the modulo operation is a Barrett reduction. In an embodiment, the reduction circuit is a processor core to execute a decoded instruction to add the first segment of the output of the multiplier circuit with the second segment of the output. In an embodiment, the reduction circuit further comprising a carry generation circuit, wherein the modulo operation includes utilizing the carry generation circuit to enable a single bit output responsive to a carry generated at a most significant bit of a binary addition of two different segments of the output of the multiplier circuit. In an embodiment, the reduction circuit further is to perform an AND operation between the single bit output of the carry generation circuit and a representation of a prime number that is a divisor of the modulo operation. In an embodiment, the modulo operation includes performance of an AND operation between a single bit of the output of the multiplier circuit and a representation of a prime number that is a divisor of the modulo operation.

In at least one embodiment, a system comprises means for performing an integer multiplication; and means for performing a modulo operation on an output of the multiplier circuit, wherein the modulo operation includes adding a first segment of an output of the multiplier circuit to a second segment of the output of the multiplier circuit.

In an embodiment, the modulo operation is a Barrett reduction. In an embodiment, the means for performing a modulo operation is a processor core to execute a decoded instruction to add the first segment of the output of the multiplier circuit with the second segment of the output. In an embodiment, the means for performing a modulo operation comprises a carry generation circuit, wherein the modulo operation includes utilizing the carry generation circuit to enable a single bit output responsive to a carry generated at a most significant bit of a binary addition of two different segments of the output of the multiplier circuit. In an embodiment, the means for performing a modulo operation are further to perform an AND operation between the single bit output of the carry generation circuit and a representation of a prime number that is a divisor of the modulo operation. In an embodiment, the modulo operation includes performance of an AND operation between a single bit of the output of the multiplier circuit and a representation of a prime number that is a divisor of the modulo operation.

In at least one embodiment, a system comprises a system memory; and a processor coupled to the system memory, the processor comprising a multiplier circuit to perform an integer multiplication; and a reduction circuit to perform a modulo operation on an output of the multiplier circuit, wherein the modulo operation includes adding a first segment of an output of the multiplier circuit to a second segment of the output of the multiplier circuit.

In an embodiment, a system further comprises a memory controller to transfer an instruction to add the first segment to the second segment from the system memory to the processor. In an embodiment, a system further comprises a network interface controller to communicate an authentication signature and associated data to a network, the authentication signature generated at least in part by the multiplier circuit and the reduction circuit. In an embodiment, the multiplier circuit is to comprise a plurality of adders to sum a plurality of partial products, wherein carry outputs of the adders are propagated responsive to a first value of a configuration parameter and suppressed responsive to a second value of a configuration parameter. In an embodiment, the modulo operation is a Barrett reduction. In an embodiment, the reduction circuit is a processor core to execute a decoded instruction to add the first segment of the output of the multiplier circuit with the second segment of the output. In an embodiment, the reduction circuit further comprising a carry generation circuit, wherein the modulo operation includes utilizing the carry generation circuit to enable a single bit output responsive to a carry generated at a most significant bit of a binary addition of two different segments of the output of the multiplier circuit. In an embodiment, the reduction circuit further to perform an AND operation between the single bit output of the carry generation circuit and a representation of a prime number that is a divisor of the modulo operation. In an embodiment, the modulo operation includes performance of an AND operation between a single bit of the output of the multiplier circuit and a representation of a prime number that is a divisor of the modulo operation.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a multiplier circuit to:
      operate in an integer multiplication mode responsive to a first value of a configuration parameter; and
      operate in a carry-less multiplication mode responsive to a second value of the configuration parameter;
   a first reduction circuit to reduce a first output of the multiplier circuit responsive to the first value of the configuration parameter; and
   a second reduction circuit to reduce a second output of the multiplier circuit responsive to the second value of the configuration parameter.

2. The processor of claim 1, the multiplier circuit to comprise a plurality of adders to sum a plurality of partial products, wherein carry outputs of the adders are propagated responsive to the first value of the configuration parameter and suppressed responsive to the second value of the configuration parameter.

3. The processor of claim 1, the multiplier circuit to perform an integer multiplication of a first authenticated encryption algorithm responsive to the first value of the configuration parameter and to perform a carry-less multiplication of a second authenticated encryption algorithm responsive to the second value of the configuration parameter.

4. The processor of claim 3, wherein the first authenticated encryption algorithm is Poly1305 and the second authenticated encryption algorithm is Advanced Encryption Standard (AES)-Galois/Counter Mode (GCM).

5. The processor of claim 1, the multiplier circuit to operate in a packed carry-less multiplication mode responsive to a third value of the configuration parameter.

6. The processor of claim 1, wherein the first reduction circuit is to reduce the first output of the multiplier circuit by performing a modulo operation using a prime number as a divisor and the second reduction circuit is to reduce the second output of the multiplier circuit based on a first polynomial.

7. The processor of claim 1, further comprising a reduction circuit to perform a modulo operation on an output of the multiplier circuit, wherein the modulo operation includes, in part, adding a first segment of an output of the multiplier circuit to a second segment of the output of the multiplier circuit.

8. The processor of claim 7, wherein the reduction circuit is a processor core to execute a decoded instruction to add the first segment of the output of the multiplier circuit to the second segment of the output of the multiplier circuit.

9. A system comprising:
   a system memory; and
   a processor coupled to the system memory, the processor comprising:
      a multiplier circuit to:
         operate in an integer multiplication mode responsive to a first value of a configuration parameter; and
         operate in a carry-less multiplication mode responsive to a second value of the configuration parameter;
      a first reduction circuit to reduce a first output of the multiplier circuit responsive to the first value of the configuration parameter; and
      a second reduction circuit to reduce a second output of the multiplier circuit responsive to the second value of the configuration parameter.

10. The system of claim 9, further comprising a memory controller to transfer the configuration parameter from the system memory to the processor.

11. The system of claim 9, further comprising a network interface controller to communicate an authentication signature and associated data to a network, the authentication signature generated at least in part by the multiplier circuit.

12. The system of claim 9, the multiplier circuit to operate in a packed carry-less multiplication mode responsive to a third value of the configuration parameter.

13. The system of claim 9, the multiplier circuit to comprise a plurality of adders to sum a plurality of partial products, wherein carry outputs of the adders are propagated responsive to the first value of the configuration parameter and suppressed responsive to the second value of the configuration parameter.

14. A processor comprising:
   a multiplier circuit to perform an integer multiplication; and
   a reduction circuit to perform a modulo operation on an output of the multiplier circuit, wherein the modulo operation includes adding a first segment of an output of the multiplier circuit to a second segment of the output of the multiplier circuit, wherein the modulo operation includes performance of an AND operation between a single bit of the output of the multiplier circuit and a representation of a prime number that is a divisor of the modulo operation.

15. The processor of claim 14, wherein the modulo operation is a Barrett reduction.

16. The processor of claim 14, wherein the reduction circuit is a processor core to execute a decoded instruction to add the first segment of the output of the multiplier circuit with the second segment of the output.

17. The processor of claim 14, the reduction circuit further comprising a carry generation circuit, wherein the modulo operation includes utilizing the carry generation circuit to enable a single bit output responsive to a carry generated at a most significant bit of a binary addition of two different segments of the output of the multiplier circuit.

18. The processor of claim 17, the reduction circuit further to perform an AND operation between the single bit output of the carry generation circuit and a representation of a prime number that is a divisor of the modulo operation.

* * * * *